(12) United States Patent
Ostiguy

(10) Patent No.: US 9,300,984 B1
(45) Date of Patent: Mar. 29, 2016

(54) INDEPENDENT PROCESSING OF DATA STREAMS IN CODEC

(71) Applicant: MATROX GRAPHICS INC., Dorval (CA)

(72) Inventor: Jean-Jacques Ostiguy, Montreal (CA)

(73) Assignee: MATROX GRAPHICS INC., Dorval, Quebec (CA)

( * ) Notice: Subject to any disclaimer, the term of this patent is extended or adjusted under 35 U.S.C. 154(b) by 327 days.

(21) Appl. No.: 13/622,794

(22) Filed: Sep. 19, 2012

Related U.S. Application Data

(60) Provisional application No. 61/625,995, filed on Apr. 18, 2012.

(51) Int. Cl.
  *H04N 19/88* (2014.01)
  *H04N 19/42* (2014.01)
  *H04N 19/423* (2014.01)
  *H04N 19/43* (2014.01)
  *H04N 19/433* (2014.01)
  *G06T 1/60* (2006.01)

(52) U.S. Cl.
  CPC .............. *H04N 19/88* (2014.11); *H04N 19/42* (2014.11); *H04N 19/423* (2014.11); *H04N 19/43* (2014.11); *H04N 19/433* (2014.11); *H04N 19/439* (2014.11); *G06T 1/60* (2013.01)

(58) Field of Classification Search
  CPC ..... H04N 19/42; H04N 19/88; H04N 19/423; H04N 19/422; H04N 19/439
  See application file for complete search history.

(56) References Cited

U.S. PATENT DOCUMENTS

| | | | | |
|---|---|---|---|---|
| 5,309,292 A * | 5/1994 | Takakura | ........... | G11B 20/1809 348/409.1 |
| 5,473,479 A * | 12/1995 | Takakura | ........... | G11B 20/1809 360/32 |
| 6,108,487 A * | 8/2000 | Takeda | ................ | H04N 9/8047 375/E7.094 |
| 8,737,469 B1 * | 5/2014 | Huang | ............. | H04N 19/00103 375/240.12 |
| 2004/0184532 A1 * | 9/2004 | Juri | ...................... | H04N 19/176 375/240.2 |
| 2007/0195888 A1 * | 8/2007 | Sabeti | ...................... | 375/240.24 |
| 2008/0123970 A1 * | 5/2008 | Ozaki | .................... | H04N 1/387 382/232 |
| 2008/0181522 A1 * | 7/2008 | Hosaka | .................. | H04N 19/63 382/251 |
| 2009/0092184 A1 * | 4/2009 | Wu | .................. | H04N 19/00521 375/240.01 |
| 2010/0135489 A1 * | 6/2010 | Ziesler | ................ | H04N 7/1675 380/210 |
| 2011/0026844 A1 * | 2/2011 | Francois | .............. | H04N 19/176 382/233 |
| 2011/0150085 A1 * | 6/2011 | Andrijanic et al. | ...... | 375/240.12 |
| 2011/0206121 A1 * | 8/2011 | Takada | .................. | H04N 19/00 375/240.12 |

* cited by examiner

*Primary Examiner* — David N Werner

(74) *Attorney, Agent, or Firm* — Norton Rose Fulbright Canada LLP

(57) ABSTRACT

There is described herein a system and method for processing data streams in a codec having multiple modules, whereby each module may process macroblocks using its own designated processing order. The processing order of a first module may differ from the processing order of a second module.

28 Claims, 18 Drawing Sheets

INDEPENDENT PROCESSING OF DATA STREAMS IN CODEC

CROSS-REFERENCE TO RELATED APPLICATIONS

The present application claims priority under 35 U.S.C. §119(e) of U.S. Provisional Patent Application No. 61/625,995 filed on Apr. 18, 2012, the contents of which are hereby incorporated by reference.

TECHNICAL FIELD

The present invention relates to the field of image data compression and decompression.

BACKGROUND OF THE ART

Applications that use image data are found in many different fields, such as security control, television, broadcasting, social media, video telephony, videoconferencing, wireless devices, streaming media applications, remote desktop, cloud computing, and others. Image data may refer to video data, computer generated graphics data, desktop data, or any other type of data depicting a visual perception. Image data may be stored in a variety of medium (DVDs, Blu-Ray disks, mobile devices, memory sticks, hard-drive, etc) and may be transmitted through a variety of medium such as fiber optics, IP connections, USB, satellite, etc.

Image compression and decompression are performed to reduce the consumption of expensive resources, such as storage space or transmission bandwidth. In general, a codec (encoder/decoder) includes an encoder used to convert the source data into a compressed form occupying a reduced space prior to storage or transmission. The codec may also comprise a decoder which receives compressed data and converts it into a decompressed image or stream ready for display or for further processing. The codec may be a software implementation, a hardware implementation, or a combination thereof.

Image compression/decompression is a multi-step process, including for example prediction, transformation, quantization, and entropy. The variability in required time and resources of each step makes it difficult to optimize the process as a whole, and to address specific needs of each step without negatively impacting other steps.

SUMMARY

There is described herein a system and method for processing data streams in a codec having multiple modules, whereby each module may process macroblocks using its own designated processing order. The processing order of a first module may differ from the processing order of a second module.

In accordance with a first broad aspect, there is provided a method for compressing/decompressing a data stream with a compression/decompression device comprising at least a first module and a second module, the method comprising: processing a first subset of macroblocks of the data stream in the first module in accordance with a first processing order; writing to memory the first subset of macroblocks in accordance with a first predetermined configuration; reading from memory the first subset of macroblocks in the first predetermined configuration by the second module; and processing the first subset of macroblocks in the second module in accordance with a second processing order different from the first processing order.

In accordance with another broad aspect, there is provided a compression/decompression device for processing a data stream comprising: a first module configured for processing a first subset of macroblocks of the data stream in accordance with a first processing order, and writing to memory the first subset of macroblocks in accordance with a first predetermined configuration; and a second module configured for reading from memory the first subset of macroblocks in the first predetermined configuration, and processing the first subset of macroblocks in accordance with a second processing order different from the first processing order.

In this specification, the term "macroblock" is intended to mean a partition of a frame representing image data. For example, a macroblock may correspond to a 16×16 sample region of a picture (16×16 luma samples, 8×8 Cb and 8×8 Cr samples). Other partitionings will be readily understood by those skilled in the art. A picture may be coded as one or more slices, each containing an integral number of macroblocks from 1 to the total number of macroblocks in a picture (1 slice per picture). The number of macroblocks per slice need not be constant within a picture. While the present description refers to the processing of macroblocks, it should be understood that the image data may be processed using slices or entire pictures.

BRIEF DESCRIPTION OF THE DRAWINGS

Further features and advantages of the present invention will become apparent from the following detailed description, taken in combination with the appended drawings, in which:

FIG. 2b is a flowchart of an exemplary method for compressing image data using the codec of FIG. 2a;

FIG. 3 is a block diagram of an exemplary prediction module of the codec of FIG. 2a;

FIG. 4 is a block diagram of an exemplary transformation module of the codec of FIG. 2a;

FIG. 6a is a flowchart of an exemplary method for decompressing image data using the codec of FIG. 2a;

FIGS. 8a-8d are exemplary illustrations of processing orders for modules of the codec of FIG. 2a;

It will be noted that throughout the appended drawings, like features are identified by like reference numerals.

DETAILED DESCRIPTION

Figure 1:
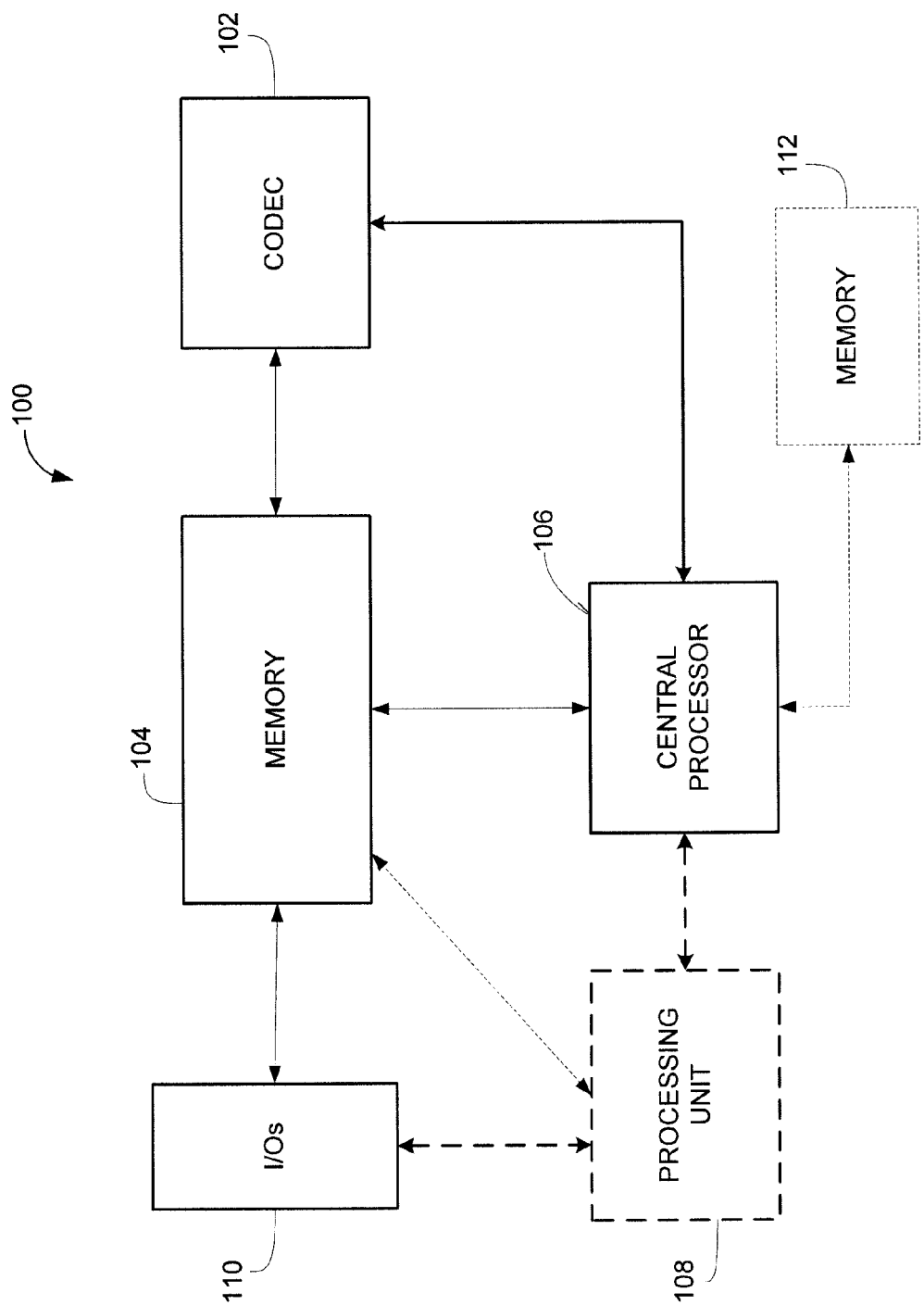
FIG. 1 is a block diagram of an exemplary system comprising a codec.

FIG. 1 illustrates a system 100 comprising a codec 102, a memory 104, and a central processor 106. The memory 104 accessible by the central processor 106 receives and stores data. The memory 104 may be a main memory of the central processor 106, such as a high speed Random Access Memory (RAM), or a local memory. The central processor 106 may access the memory 104 to retrieve data.

In some embodiments, the system 100 may also comprise one or more processing unit 108 connected to the memory 104. This additional processing unit 108 may correspond to a graphics processing unit, a video processing unit, a display engine, an audio processor, or any other type of processing unit known to those skilled in the art. A plurality of input/output interfaces 110 may also be provided to allow the system 100 to receive and transmit data from/to external modules and/or peripheral devices. Also illustrated in FIG. 1 is a second memory 112 connected to the central processor 106.

The components of the system 100 may be packaged in various manners. For example, the central processor 106 and the codec 102 may be included in a System-on-a-chip (SoC). The codec 102 may be included in a chip while the central processor 106 is provided externally to the chip. The memory 104 and the codec 102 may be provided in an SoC or a chip. The codec 102 may be included in an integrated circuit or a chip and the memory 104 may be external to the integrated circuit. The codec 102, the central processor 106, the processing unit 108 and the Input/Output interfaces 110 may be connected to the memory 104 through a memory controller (not shown). The codec 102 may also be located remotely from the central processor 106 with the two components being part of a network.

The image data to be compressed/decompressed may be stored in memory 104, memory 112 or any other memory operatively connected to codec 102, directly or indirectly. If the image data is stored externally to the system 100, it may be copied into memory 104 or memory 112 before processing, by the codec 102 or by a dedicated module, such as a copy engine (not shown). The image data may correspond to a stream of pictures, a picture, and/or a portion of a picture. A picture may be a frame or a field. In some embodiments, a portion of a picture may correspond to one or more macroblocks. For example, a portion of a picture may be a slice.

The codec 102 may use one or more of a number of previously encoded pictures as a reference for motion-compensated prediction of each inter coded macroblock or macroblock partition. This enables the codec 102 to search for the best match for the current macroblock partition from a wider set of pictures than just the previously encoded picture. The codec may thus maintain one or more lists of reference pictures, containing pictures that have previously been encoded and decoded (occurring before and/or after the current picture in display order).

Figure 2A:
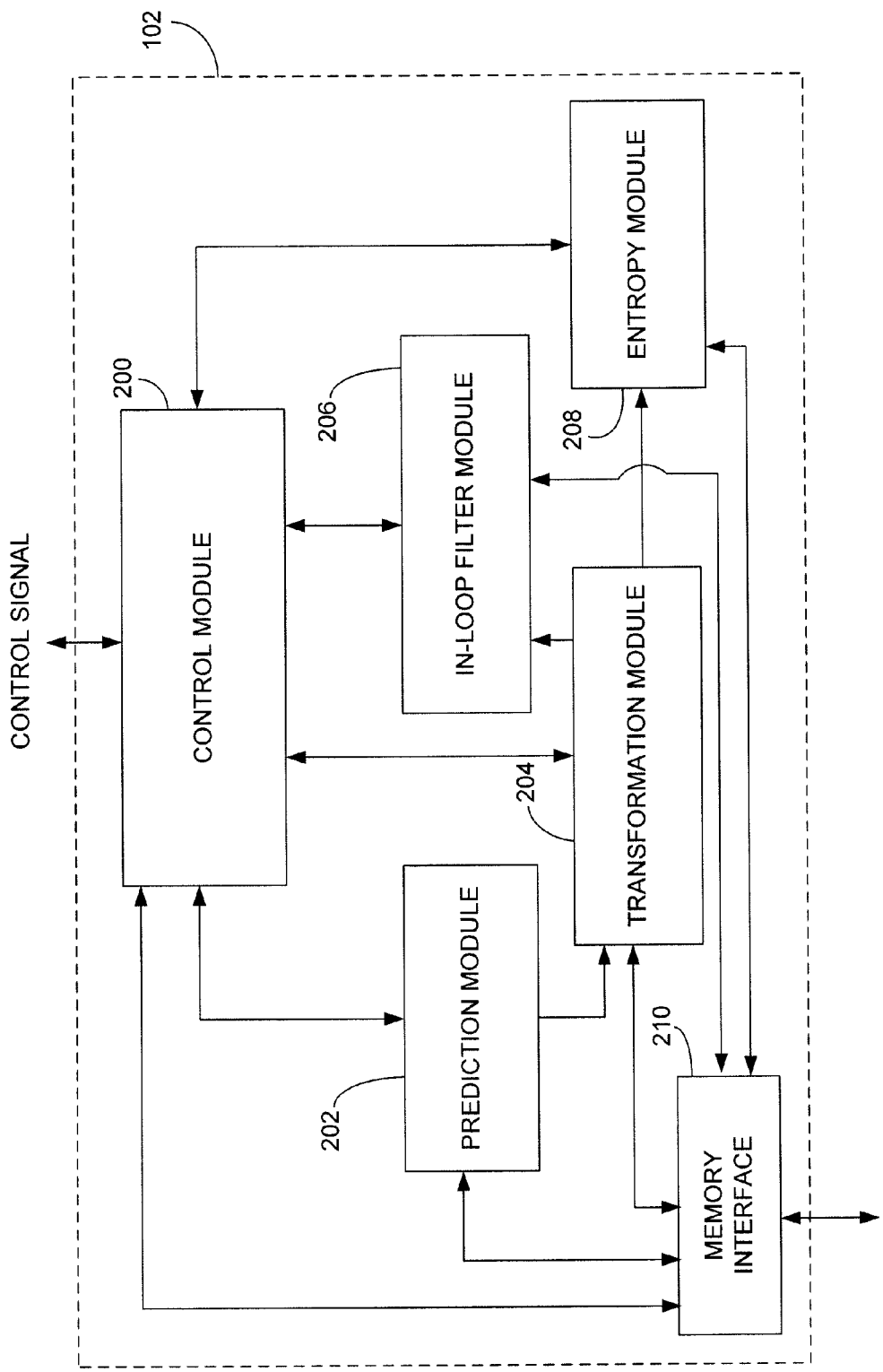
FIG. 2a is a block diagram of an exemplary codec for compressing and/or decompressing image data.

FIG. 2a is a block diagram of an exemplary embodiment of the codec 102 for encoding an uncompressed bit stream into a compressed bit stream and/or for decoding a compressed bit stream into an uncompressed bit stream. In this embodiment, a control module 200 acts as an initial input point for the codec 102. A control signal may be received by the control module 200 in order to trigger compression and/or decompression of the image data. The control signal may be generated by an application running on central processor 106, processing unit 108, or another processing unit operatively connected to codec 102, directly or indirectly. The application may request that an entire stream of pictures, a portion of a stream of pictures, a picture, or a portion of a picture be compressed and/or decompressed. In some embodiments, the request for compression and/or decompression may be broken down into a plurality of requests for compressing/decompressing portions of the stream. The plurality of requests may comprise one or more steps for configuring the codec 102 according to the application's initial request.

The control signal may comprise control information to allow the control module 200 to configure the various modules of the codec 102 with appropriate parameters in order to perform the requested task(s) of compressing/decompressing image data. Configuration may be performed in one or more steps, depending on the initial request and on the format of the request. Compression/decompression parameters such as picture resolution, output bit rate, picture type and coding functions may be provided to the control module 200 together with the request for compression/decompression or separately therefrom. Depending on the task, some of the modules may not need to be configured and may not be used to process data.

A prediction module 202, transformation module 204, in-loop filter module 206 and entropy module 208 are each connected to a memory interface 210 in order to read and write data to memory 104 without passing through the control module 200. In the embodiment illustrated, the memory interface 210 is internal to the codec 102 while the memory 104 is external to the codec 102. In an alternative embodiment, both the memory interface 210 and the memory 104 are external to the codec 102. The transformation module 204 and the entropy module 208 may be connected together in order to pass information directly therebetween. In an alternative embodiment, the prediction module 202 and the transformation module 204 may be connected together to pass information directly therebetween without going through the memory. The transformation module 204 may also be connected directly to the in-loop filter module 206. The prediction module 202, transformation module 204, in-loop filter module 206 and entropy module 208 are each connected to the control module 200 for configuration and control of the process.

In one embodiment, the codec 102 is configured to compress image data. In general, image data is stored in the memory 104 and requests are sent to the codec 102 to compress the image data. Following the receipt of the compression requests, the control module 200 of the codec 102 configures the prediction module 202 with appropriate parameters for processing the image data stored in memory 104. The prediction module 202 accesses the memory 104 through the memory interface 210, processes image data, and stores the result in the memory 104. In a second step the transformation module 204 is configured with appropriate parameters and retrieves data from the memory 104 in order to process it. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data, and stores it back in memory. In a subsequent step, data is read from memory 104, processed by the entropy module 208, and stored back to the memory 104. In another embodiment, the entropy module 208 reads data from memory 104 and outputs processed data to an external module without going through memory 104.

Figure 2B:
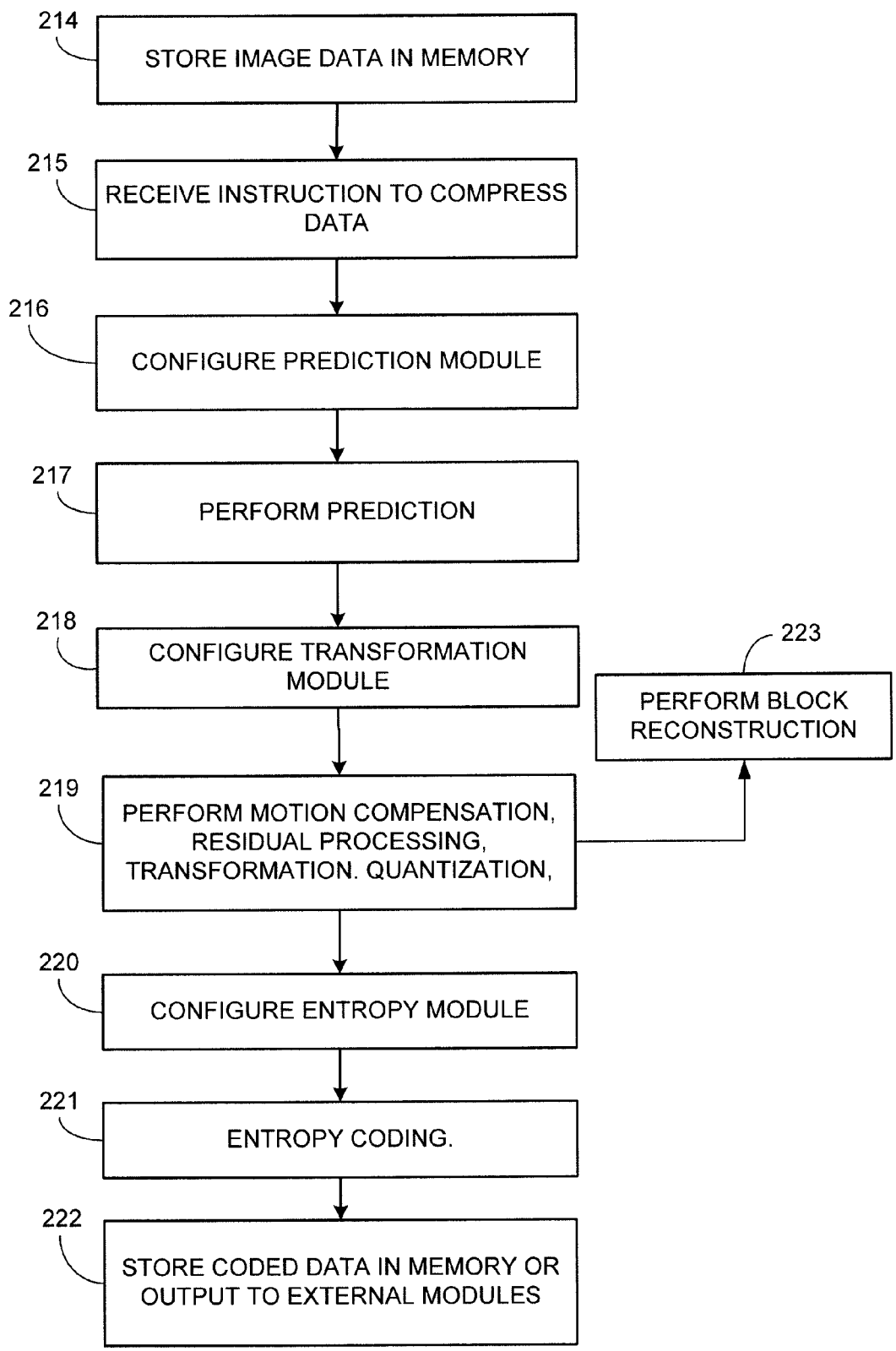

Referring to FIG. 2b, the processing steps performed within codec 102 for compressing image data are described in more detail in accordance with one embodiment. At step 214, image data is stored in memory 104. At step 215, the control module 200 receives parameters indicative of how image data should be processed along with a request to compress the image data. The parameters may comprise the address in memory of the image data that needs to be compressed, the resolution of the image data, the type of compression requested, a Group of Pictures (GOP), a desired output bit rate, etc. In some embodiments, the control module 200 may receive configuration parameters before receiving a request to process image data. These configuration parameters may be used to configure the different modules of the codec 102.

At step 216, the control module 200 configures the prediction module 202, through a communication path according to the received request. According to some embodiments, the prediction module 202 is a register-based engine comprising a set of registers and processing units, with access to the memory 104. The registers may be configured with information comprising the address of image data to be encoded, the number of reference pictures needed, coefficients representative of a quantization parameter (qp), a slice type (e.g. I, B, P), the number of macroblock divisions allowed for each macroblock of the image data, etc. In one embodiment the control module 200 configures the prediction module 202 to process a group of macroblocks. In another embodiment, the control module 200 configures the prediction module 202 to process a slice.

At step 217, the prediction module 202 accesses the image data in memory 104 and determines for each macroblock how the compression will be performed by the subsequent modules of the codec. For example, for a current macroblock the prediction module 202 may determine its corresponding predicted macroblock and a corresponding prediction type (i.e. intra or inter prediction). In some embodiments, the prediction module 202 outputs for a macroblock, at least one motion vector (or a motion vector difference) and an prediction type (Inter or intra). The output data is stored in a buffer such as a prediction buffer (PB) in memory 104. The prediction module 202 may also output information related to a quantization parameter for processing of the macroblock in the transformation module 204 and other types of data such as a skip macroblock. This information is stored in memory 104. In some embodiments, the prediction module 202 may divide a macroblock into a plurality of sub-macroblocks and the processing is then performed for each sub-macroblock. The subdivision of a macroblock may be determined according to input parameters.

At step 218, the control module 200 configures the transformation module 204 to process image data. In some embodiments the control module 200 may also configure the in-loop filter module 206 at step 218. In other embodiments, the control module 200 configures the in-loop filter module 206 at a later step. In one example, the control module 200 configures the transformation module 204 with the address of the data to process, the address of at least one reference picture (in some embodiments, the transformation module may need to access more than one reference picture), a quantization parameter and other control parameters necessary to perform compression. In another example, the control module 200 configures the transformation module 204 with the address of the data to process, a quantization parameter and other control parameters necessary to perform compression. The data to be processed by the transformation module 204 may be retrieved from the prediction buffer (PB).

At step 219, the transformation module 204, performs motion compensation or intra prediction, residual processing, frequential transformation and quantization for each macroblock of the image data. Once the data is processed, it may be stored in memory 104 in a transformation buffer (TB). The transformation buffer may comprise for each processed macroblock a corresponding quantized macroblock, a corresponding motion vector(s) (or motion vector difference), a compression type associated with the quantized macroblock, partitioning information if a macroblock is partitioned, and may comprise additional parameters needed by the entropy module 208. The transformation module 204 further performs a plurality of lossless encoding schemes at step 219.

In some embodiments, the transformation module 204 may reconstruct a macroblock as shown at step 223. In these embodiments, the transformation module 204 performs an inverse quantization on the previously obtained quantized macroblock. Further the transformation module 204 performs inverse frequential transformation and motion compensation and residual processing in order to obtain a reconstructed macroblock associated with the quantized macroblock and to the initial macroblock output to the transformation module 204 to be compressed. The reconstructed macroblock is finally stored in the memory 104 in a reconstructed buffer (RB). Data from the reconstructed buffer may be used as reference pictures during the compression of subsequent picture. While the transformation module 204 is described as processing macroblocks, when a division of the macroblock is requested, the transformation module 204 processes each sub-macroblock of the macroblock.

According to some embodiments, step 223 may further comprise a step of filtering the reconstructed macroblocks with the in-loop filter module 206. More specifically, the in-loop filter module 206 accesses data from the reconstructed buffer (RB) to perform smoothing of sharp edges which can form between decoded macroblocks in order to improve visual quality of decompressed data. In these embodiments, the output of the in-loop filter module 206 is stored in the reconstructed buffer and is used as reference picture during the compression of subsequent macroblocks.

At step 220, the control module 200 configures the entropy module 208 to complete the lossless compression of the image data and to output a final encoded image data. At this step, the control module 200 may also generate a header which will be assembled with the data, once the data has finished being encoded by the entropy module 208. At step 221, the entropy module 208 reads data from the transformation buffer (TB). For each quantized macroblock and its associated data (such as a corresponding motion vector difference, a compression type and partitioning information), the entropy module 208 applies an entropy encoding algorithm. For example, the entropy module 208 may implement one of Context-Based Adaptive Variable Length Coding (CAVLC) or Context-based Adaptive Binary Arithmetic Coding (CABAC) as defined in the H.264 standard. In other embodiments the entropy module 208 may implement any other suitable entropy coding algorithms. At a final step 222, the encoded image data is stored in memory 104 or output to external devices for further processing and/or transmission.

Figure 3:
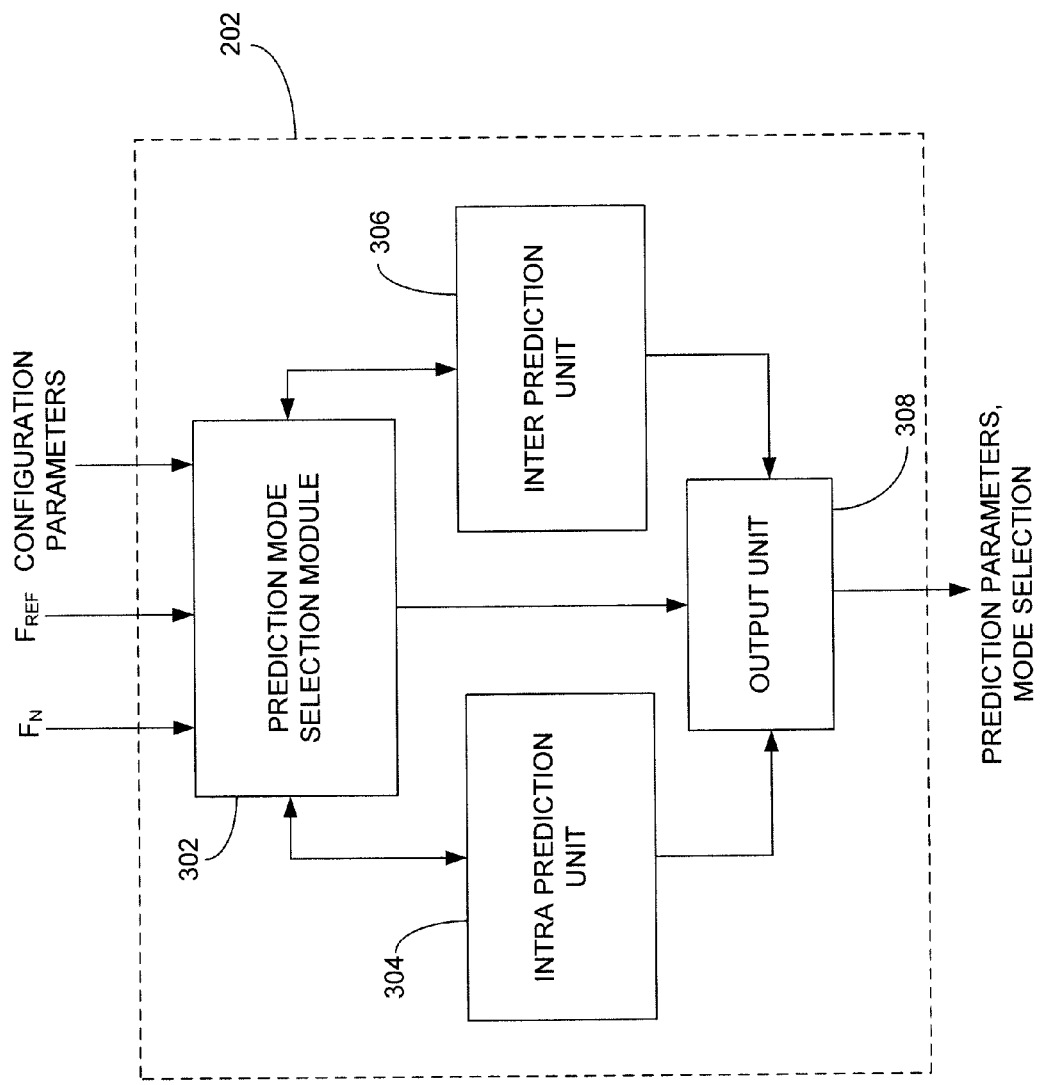

FIG. 3 illustrates an exemplary embodiment for the prediction module 202. A prediction mode selection module 302 receives configuration parameters, image data $F_N$ and reference pictures $F_{REF}$, and chooses between an intra prediction mode and an inter prediction mode for the compression of the image data. If intra prediction is used, information contained only within the current picture may be used for the prediction. If inter prediction is used, information from a previously encoded picture may be used in the prediction. The selection of the prediction mode is made using a variety of factors, such that a difference between a prediction and the image data is minimized.

The selected mode is sent to an output unit 308. An intra prediction unit 304 is used to generate prediction parameters according to an intra mode, such as the partitioning of the image data. An inter prediction unit 306 is used to generate prediction parameters for an inter mode, such as the partitioning, motion vectors, and selected reference pictures. The prediction parameters from both the intra prediction unit 304 and the inter prediction unit 306 are provided to the output unit 308. In some embodiments, both sets of prediction parameters are output with the mode selection. Alternatively, only the prediction parameters corresponding to the selected mode are output from the prediction module 202.

The prediction module 202 may access the memory 104 to read the image data $F_N$ and reference pictures $F_{REF}$. Once the image data has been processed, the resulting prediction parameters and mode selection may be written to memory 104 via memory interface 210. Alternatively, the resulting prediction parameters and mode selection are sent directly to the transformation module 204 without going through memory 104.

Figure 4:
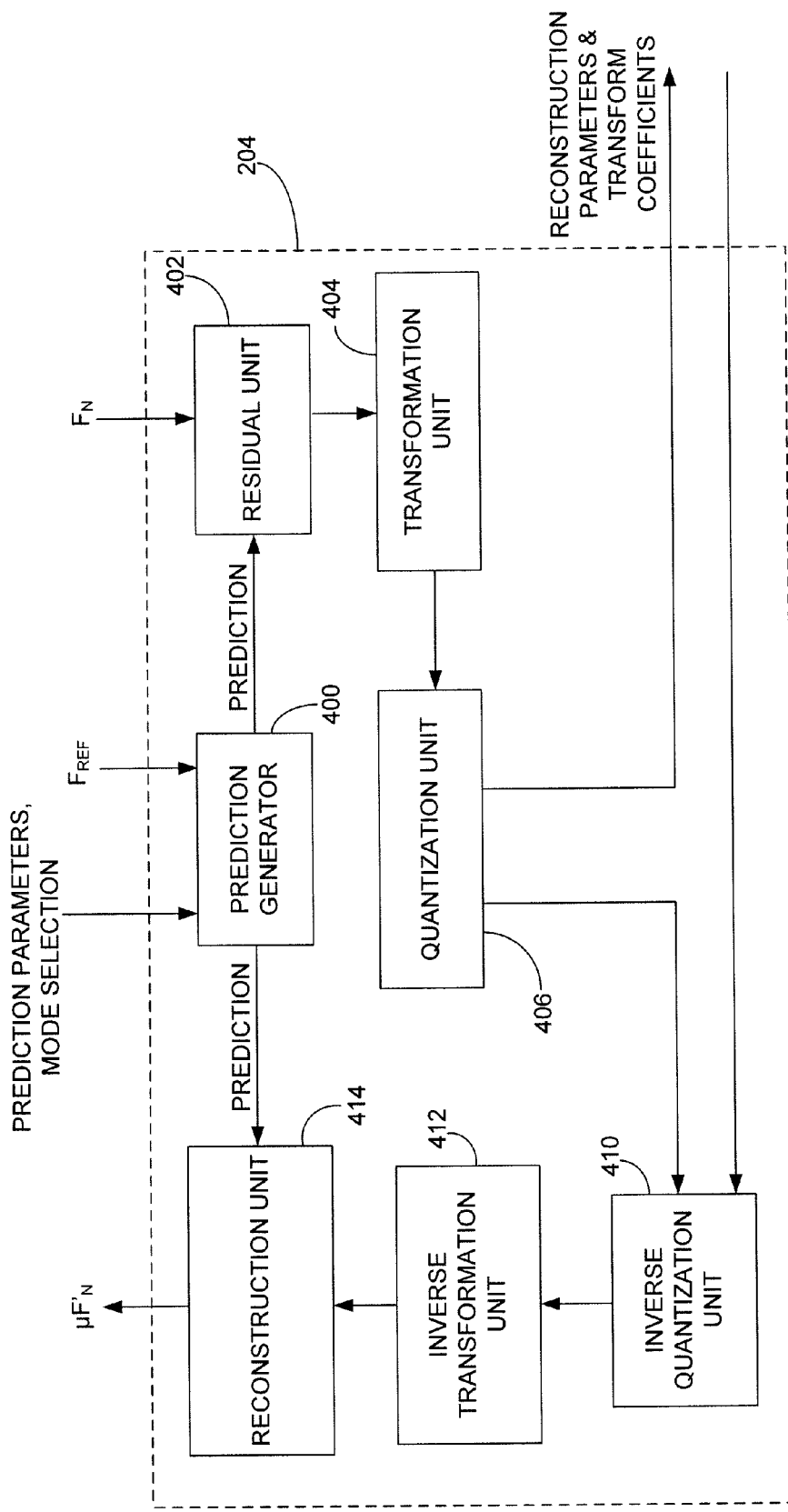

FIG. 4 illustrates an exemplary embodiment of the transformation module 204 for data compression. The prediction parameters, mode selection, and reference pictures $F_{REF}$ are read from memory 104 by the transformation module 204 and used by a prediction generator 400 to generate the prediction. The generated prediction is provided to a residual unit 402 and subtracted from the image data $F_N$ in order to generate the residual. The residual is transformed via a transformation unit 404 and quantized via a quantization unit 406 to obtain a set of quantized transform coefficients.

The transformation applied by the transformation unit 404 depends on the standard followed for the compression. For example, under H.264, various transforms are used depending on the type of residual data that is to be coded: a 4×4 or 8×8 DCT-based transform (Discrete Cosine Transform) is performed on luma and chroma coefficients and a Hadamard transform may be performed on DC coefficients in intra macroblocks predicted in 16×16 mode. Under other standards, other transforms may be used, as appropriate. The quantization unit 406 may be a scaler quantizer, as per H.264.

As well as encoding and transmitting the image data, the transformation module 204 may decode, or reconstruct, the encoded image data in order to provide a reference for further predictions. The quantized transform coefficients generated by the quantization unit 406 are scaled ($Q^{-1}$) via an inverse quantization unit 410 and inverse transformed ($T^{-1}$) via an inverse transformation unit 412 to produce a difference block $D_N'$. The prediction generated by the prediction generator 400 is added to the difference block $D_N'$ by a reconstruction unit 414 to create a reconstructed block $\mu F'_N$. The reconstructed block is a decoded and unfiltered version of the original block. The reconstruction block may be written to memory 104 for future use or passed directly to a filtering module such as the in-loop filter module 206. Alternatively, the in-loop filter module 206 may read the reconstruction block from memory 104. In some embodiments, filtering is performed to reduce the effects of blocking distortion and the reconstructed reference picture is created from a series of blocks $F_N'$. In some embodiments, the in-loop filter module 206 is not used in the compression of image data and may not be included in the codec 102. The transformation module 204 may also perform partial lossless compression on the quantized transform coefficients and recontruction parameters.

Figure 5:
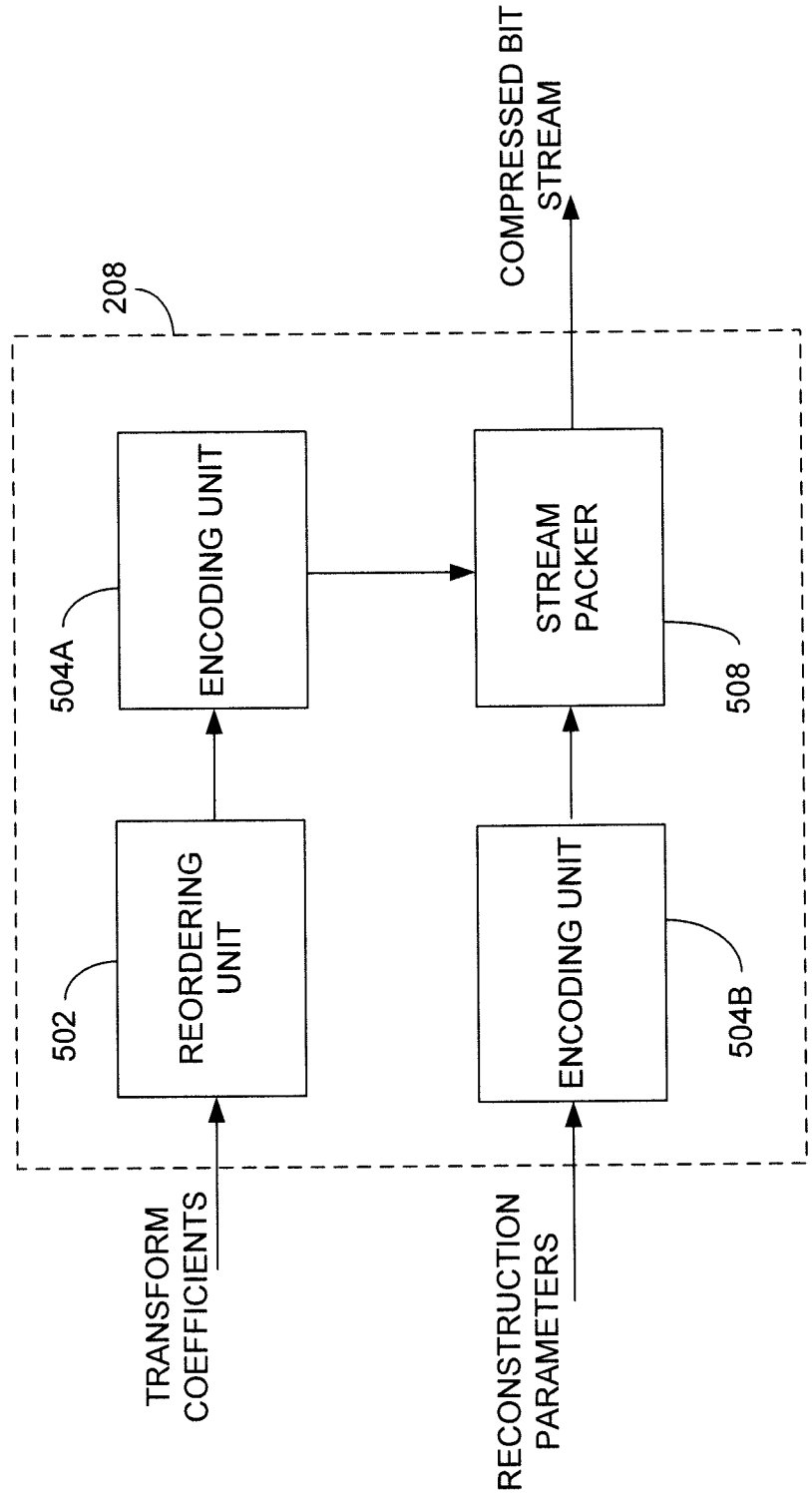
FIG. 5 is a block diagram of an exemplary entropy module for performing compression.

In accordance with some embodiments, the reconstruction parameters and transform coefficients as output by the quantization unit 406 are written to memory 104 for retrieval by the entropy module 208 for entropy coding. Alternatively, the reconstruction parameters and transform coefficients may be provided directly to the entropy module 208. In some embodiments, the reconstruction parameters and transform coefficients are partially lossless encoded in the transformation module 204 and the lossless encoding is completed in the entropy module 208 before the encoded data is output. FIG. 5 is an exemplary embodiment of an entropy module 208. A reordering unit 502 receives the transform coefficients and scans them in a given zig-zag order. Encoding unit 504a performs entropy coding on the reordered transform coefficients using any known entropy coding mappings. For example, this may be done by mapping a 2×2, 4×4, or 8×8 block of quantized transform coefficients to a 4, 16, or 64-element array, respectively. Elements may be encoded using either variable-length codes such as context-adaptive variable length codes (CAVLC) and Exp-Golomb codes, or using context-adaptive arithmetic coding (CABAC), depending on the entropy encoding mode, as per H.264. Other entropy coding compression schemes may also be applicable. Similarly, encoding unit 504b performs entropy coding on the reconstruction parameters using any known entropy coding mappings. Table 1 illustrates examples of parameters to be encoded by encoding unit 504b.

TABLE 1

| Parameters | Description |
|---|---|
| Sequence-, picture-and slice-layer syntax elements | Headers and parameters |
| Macroblock type | Prediction method for each coded macroblock |
| Coded block pattern | Indicates which blocks within a macroblock contain coded coefficients |
| Quantizer parameter | Transmitted as a delta value from the previous value of QP |
| Reference frame | |
| Reference frame index | Identify reference frame(s) for inter prediction |
| Motion vector | Transmitted as a difference (mvd) from predicted motion vector |

A stream packer 508 generates a compressed bit stream, which may be written to memory 104 or transmitted to another module, internal or external to system 100.

The codec 102 as described above and shown in FIG. 2a may also comprise additional components (not shown), such as a filtering module, a display module, an output module, and an input module. For example, the filtering module may be used to filter a picture or a stream of image data before being processed by the prediction module 202. The filtering module may also be used to remove noise from a picture before the different compression steps are performed on the picture. The display module may be used to output an uncompressed video stream stored in the memory 104 to a display monitor at a given display rate. The output module may be used to output compressed or uncompressed image data to processing modules external to the codec 102. The input module may be used to receive uncompressed image data from an external source such as a video camera. The input module may also receive compressed image data. The different modules of the codec 102 are connected to the memory 104 through the memory interface 210.

The architecture of the codec as illustrated in FIG. 2a allows certain steps of the compression process to occur in parallel and allows the performance (or efficiency) of some modules to be decoupled from the performance of other modules. For example, the entropy module 208 may read data from the memory 104 independently of the processing performed by the transformation module 206.

In some embodiments, the codec 102 is configured to decompress image data. The codec 102 may receive requests to decompress encoded image data from an application running on an external processing unit. In general, compressed image data is stored in the memory 104 and requests are sent to the codec 102 to decompress the image data. Following the receipt of the decompression requests, in a first step the control module 200 may configure the entropy module 208 to process the image data. In a second step, the control module 200 may configure the transformation module 204 to process data only once the entropy module 208 has finished processing the data. In some embodiments, the control module 200 of the codec 102 configures the entropy module 208 and the transformation module 204 with appropriate parameters for decompressing the image data. The codec 102 may also configure the in-loop filter 206 to be used during the steps of data decompression. In some examples, the in-loop filter 206 may not be used during decompression and therefore it does not need to be configured.

Once configured the entropy module 208 accesses the data in memory 104 through the memory interface 210 and stores the result of its processing in the memory 104. In other embodiments, the compressed data is not stored in memory 104 prior its processing by the entropy module 208. Instead the data is received by the entropy module 208 directly from an external source and processed upon receipt. In a second step the transformation module 204 retrieves data from the memory 104 in order to process it. The transformation module 204 may also receive data from the output of the entropy module 208 without going through the memory. In some embodiments data processed by the transformation module 204 is immediately transferred to the in-loop filter module 206 for processing without going through the memory 104. In other embodiments the transformation module 204 processes data and stores it to memory 104 before the in-loop filter module 206 accesses it. According to this embodiment, the in-loop filter module 206 reads the data from the memory 104, processes the data and stores it back in memory. In some embodiments, the decompression of data is complete once the in-loop filter 206 is done processing the data. In other embodiments, the decompression of data is complete once the transformation module 204 has finished processing the data and no filtering is required. In a final step, the control module 200 informs the application that the data has been decompressed and is available as decoded image data.

Figure 6A:
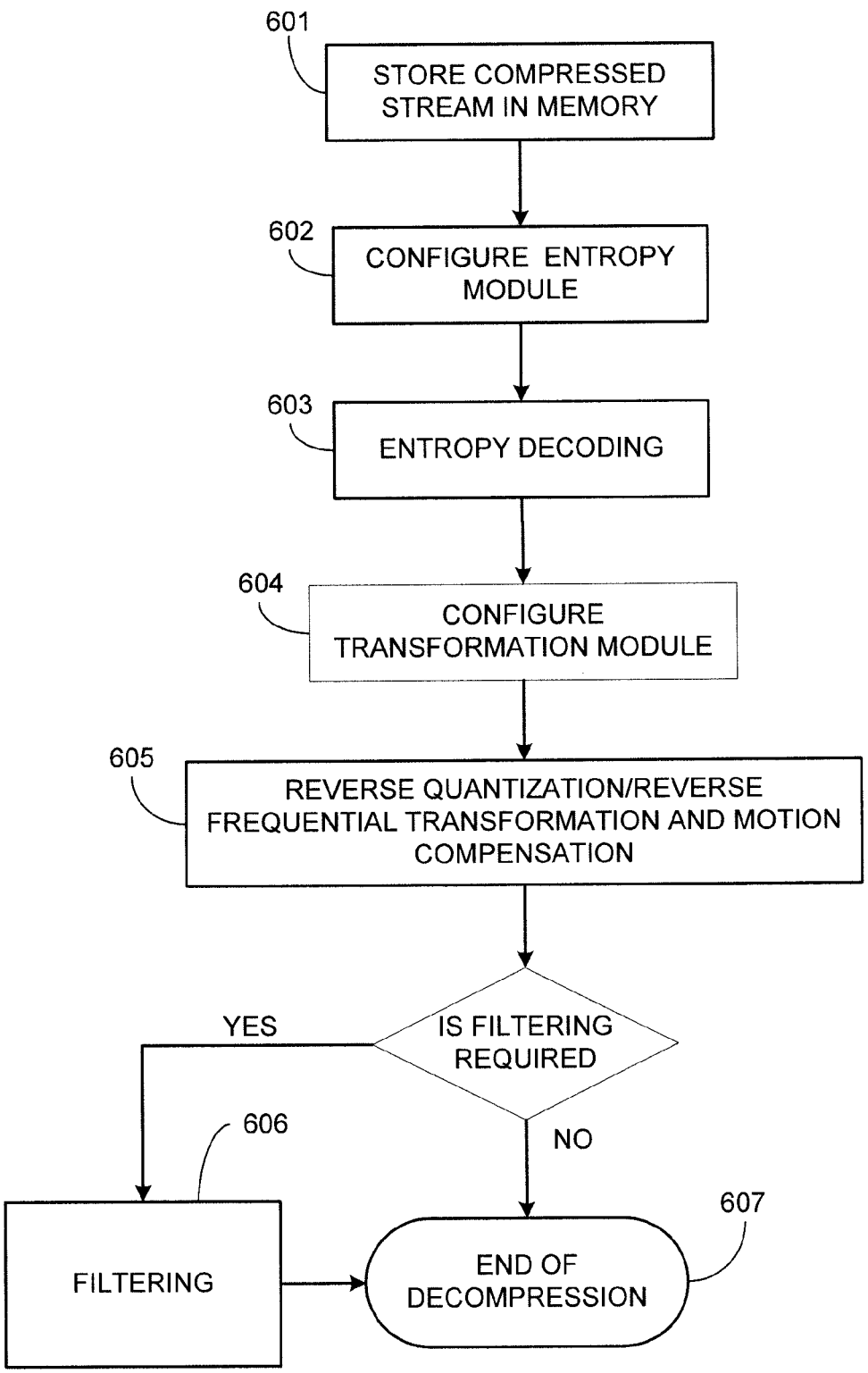

Referring to FIG. 6a, exemplary steps of data decompression are described. At step 601 the compressed data is stored in memory 104. The data is a stream of compressed image data or a portion of a total stream of compressed data. An application may need to decompress a full stream of compressed data but may store in memory 104 only a portion of the stream for decompression by the codec 102 at a given moment.

At step 602, the control module 200 configures the entropy module 208 with appropriate parameters to decompress the received data. At step 603 the entropy module 208 accesses the compressed stream and performs entropy decoding to output to an intermediate buffer. The intermediate buffer comprises reconstruction parameters and quantized coefficients. In another embodiment, the entropy module 208 may perform partial entropy decoding of the compressed stream and output it to the intermediate buffer. At step 604, the control module 200 configures the transformation module 204. At step 605, the transformation module 204 reads reference data from memory 104 and from the intermediate buffer in the memory 104. Reference data is previously decoded pictures. At this step the transformation module 204 performs inverse quantization, inverse transformation and motion compensation. In another embodiment, the transformation module 204 performs partial entropy decoding before inverse quantization, inverse transformation and motion compensation. The output of the processing by the transformation module 204 is decoded image data. The decoded data may further be processed by the in-loop filter 206 at step 606 to provide a final decoded image data. The control module 200 configures the in-loop filter module 206 only if needed. If the filtering is not requested, then the decompression is complete at step 605 and the decoded data output from the transformation module 204 is stored in memory 104. Finally, at step 607, the control processing module 200 informs the application that the decompression is complete.

Figure 6B:
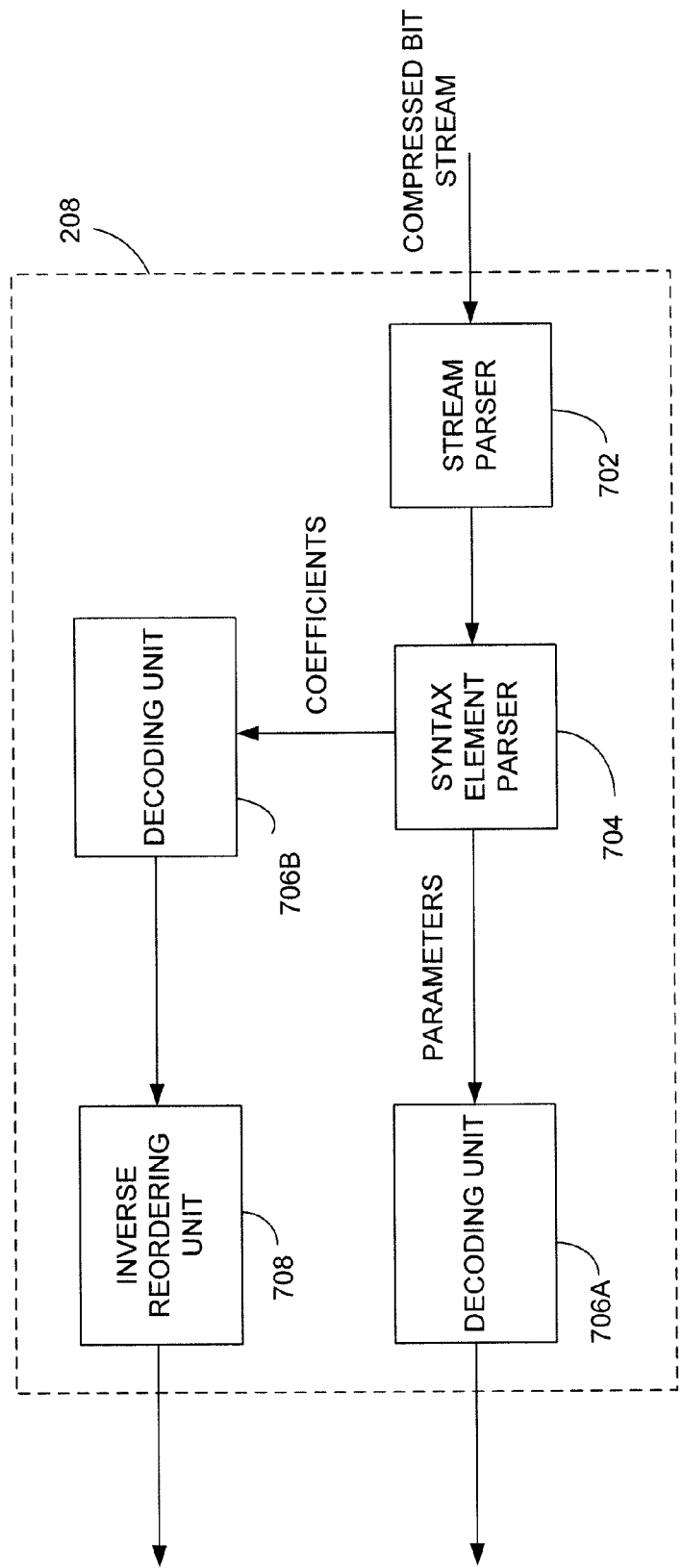
FIG. 6b is a block diagram of an exemplary entropy module for performing decompression.

FIG. 6b is an exemplary embodiment for the entropy module 208 when the codec 102 is configured to decompress image data. A stream parser 702 reads the compressed data from memory 104. A syntax element parser 704 serves to sort through the compressed data. Coefficients are sent to decoding unit 706b while parameters are sent to decoding unit 706a. Reordering of the coefficients is performed by inverse reordering unit 708 and saved in memory 104. Elements may be decoded by decoding unit 706b using either variable-length codes such as context-adaptive variable length codes (CAVLC) and Exp-Golomb codes, or using context-adaptive arithmetic coding (CABAC), depending on the entropy decoding mode. Other entropy decoding decompression schemes may also be applicable. Similarly, decoding unit 706a performs entropy decoding on the parameters using any known entropy decoding mappings.

The codec 102 may be configured to process the data in the different modules according to different processing orders. For example, the prediction module 202 may process a first subset of macroblocks of a slice in accordance with a first processing order while the transformation module 204 may subsequently process the same subset of macroblocks with a different processing order. Similarly, the entropy module 208 may then process the same subset of macroblocks with yet another processing order.

A given processing order may optimize memory bandwidth and reduce latency. It may also be used to reduce cache size as encoding/decoding of some macroblocks may require common intermediate data to be stored in the cache of the different modules of the codec 102. It may be desired to reuse certain parts of the cache for consecutive steps. However encoding/decoding sometimes requires information from other macroblocks and/or pictures to process a given macroblock in a given picture. Consequently the processing of the other macroblocks should preferably be completed before the processing of the given macroblocks starts. An optimal processing order may thus be selected for each module.

Figure 7:
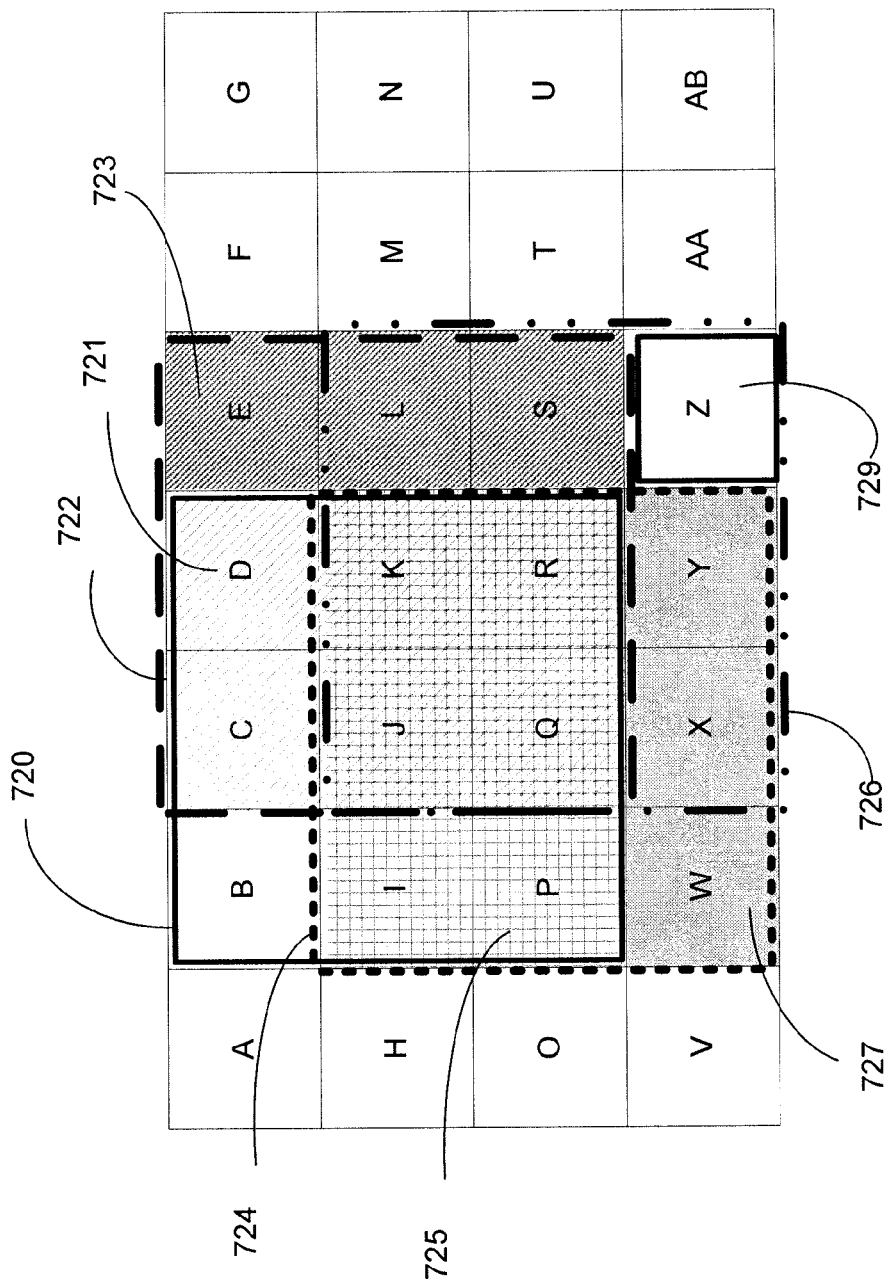
FIG. 7 schematically illustrates reading from memory for processing macroblocks.

FIG. 7 illustratively presents an example of common intermediate data used during the processing of a plurality of macroblocks in a first module. In this example, a search area is retrieved from memory and stored in a cache during the prediction step of the compression of a macroblock. In order to process macroblock J, search area 720 is retrieved from memory and stored in cache. In order to process macroblock K, search area 722 is needed. However if portion 721 of search area 722 is already in the cache then there is no need to retrieve it from memory again. The module therefore only needs to retrieve the remaining portion 723. When the module moves on to macroblock Q for processing, the search area needed in the cache is 724 which has a common portion 725 with search area 720. Therefore, if the data used to process macroblock J is still in the cache, then the module will only need to retrieve portion 727 to complete the processing of macroblock Q. Similarly, when macroblock R is being processed, search area 726 is needed in cache and if all intermediate data from the processing of previous macroblocks is still in the cache, then the module only needs to retrieve portion 729 from memory in order to process macroblock R. Therefore the processing order of the macroblocks dictates the cache size required to minimize the memory bandwidth.

Figure 8A:
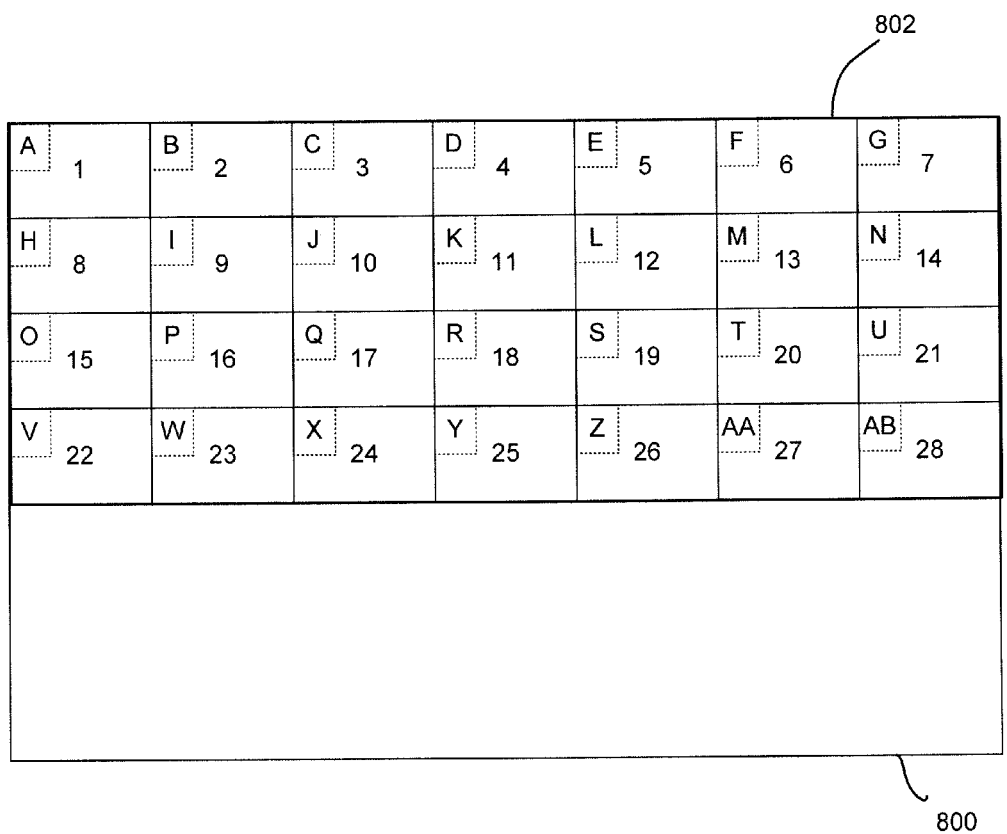

FIG. 8a illustrates a natural scan order, whereby the group of macroblocks 802 of picture 800 are processed from left to right starting with the top row and followed by the lower rows. The letters on each macroblock represent the order of the macroblock as it should appear in the compressed bit stream (or a macroblock position in the decompressed bit stream) and the numbers on each macroblock represent its processing order in the module, i.e. macroblock A is processed first, then macroblock B, then macroblock C, etc. In some embodiments, a natural scan order is used by the entropy module 208 to encode the transformed and quantized macroblocks. In these embodiments, the encoding performed in the entropy module 208 is done according to the natural order such that the compressed bit stream complies with the requirements of specific compression standards. For example, when the encoding unit 504a performs arithmetic coding, the macroblocks must be processed in the natural scan order. Similarly, the stream packer 508 also processes macroblocks and the reconstruction parameters in the natural scan order.

In one example, when macroblock I is being processed in the prediction module 202 it may need post-processing information of macroblocks A, B, C and H. In particular, the prediction module 202 may use the motion vectors of macroblocks A, B, C and H to perform or improve the prediction for macroblock I. The motion vectors will only be available once A, B, C and H were processed in the prediction module 202. In addition, the intermediate data used to perform the prediction of a macroblock may be common to a plurality of macroblocks. For example, the search area from the reference associated with the processing of macroblock A may be reused (at least in part) during the processing of macroblock B, C or H, as described above with regards to FIG. 7. Therefore the processing of the macroblocks may be performed in an order optimizing the cache size and the memory bandwidth used to retrieve the intermediate data from memory.

In one example, when macroblock I is being processed in the transformation module 204 it may need post-processing information and/or intermediate data from the processing of previous macroblocks such as macroblocks A, B, C and H. In particular the neighboring pixels of macroblocks A, B, C and H may be used to perform the Intra-prediction of macroblock I. Alternatively portions of the reference pictures used for A, B, C and H may be needed for the Inter-prediction of macroblock I. In another example, the in-loop filter 206 may use prediction modes, neighboring pixels, transform size and motion vectors of previously processed macroblocks B and H during the processing of macroblock I.

Figure 8B:
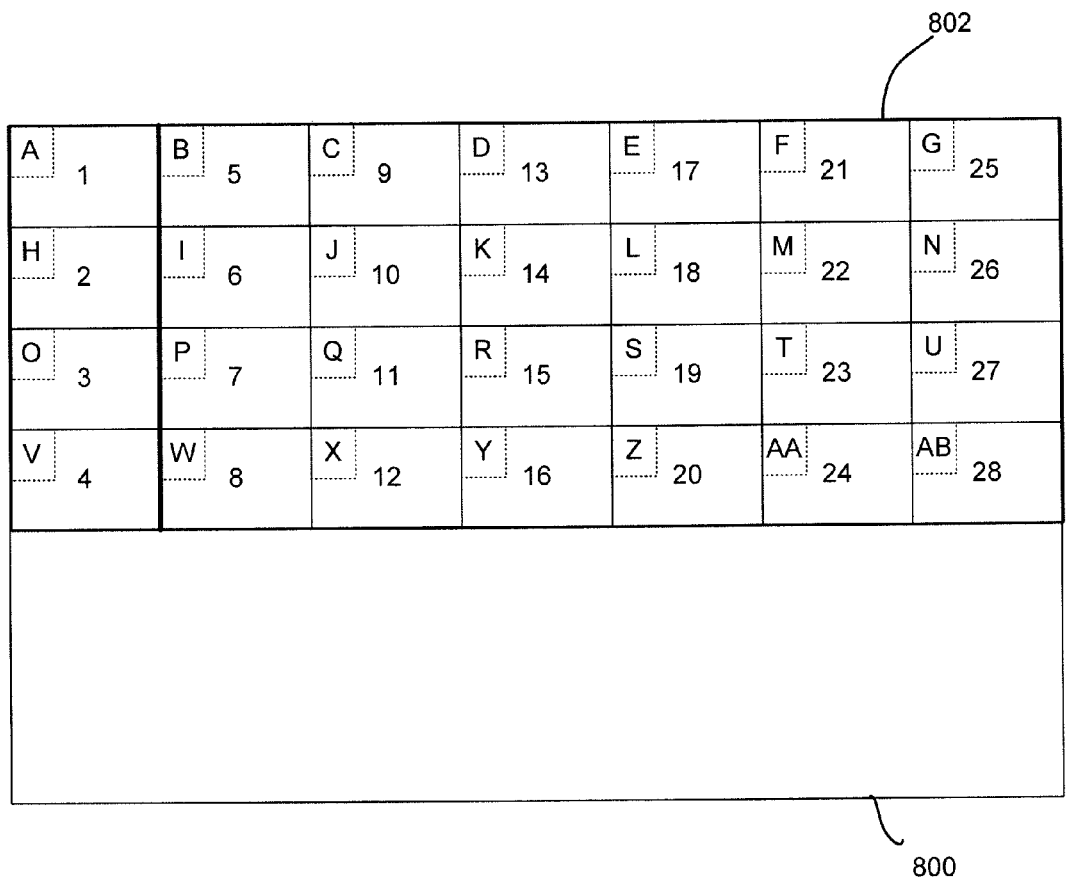

FIG. 8b illustrates an exemplary processing order different from the natural scan order of FIG. 8a. In this example, the macroblocks are processed from top to bottom starting with the left-most column and followed by the adjacent columns. Therefore the order of processing is: macroblock A, then macroblock H, then macroblock O, then macroblock V, then macroblock B, then macroblock I, etc. This example of macroblock processing order optimizes the cache size. For example, in the prediction module 202, a cache is used for reference image data. The cache size is selected such that common image data read for previous macroblocks is still in the cache when required by subsequent macroblocks. Therefore the cache size is defined in part by the search area and the number of rows of the group of macroblocks 802. When macroblock D is processed, the module needs to fetch from memory an associated search area and stores it in the module's cache. For the first macroblock the entire search area is fetched. However when the second macroblock K is processed, most of the search area needed for this macroblock is already in the cache and only a single line of macroblocks is fetched. When the processing of the next column (E, L, S, Z) starts, i.e. the prediction module 202 processes macroblock E it needs to fetch only a single column of the associated search area if the search areas associated with macroblocks D, K, R and Y are already in the module's cache. Similarly when the module processes macroblock L, a single macroblock of the associated search area is fetched from memory and stored in the cache since the rest of the search area is already in the cache from the processing of the previous macroblocks. According to this processing order, the cache size is optimized since the cache content is removed as soon as it is not be required for processing following macroblocks. For example, once the processing of macroblock Y is completed and processing of the next column starts, the data corresponding to the first columns of search areas corresponding to D, K, R and Y may be freed and used to store data needed for macroblocks E, L, S, Z.

Figure 8C:
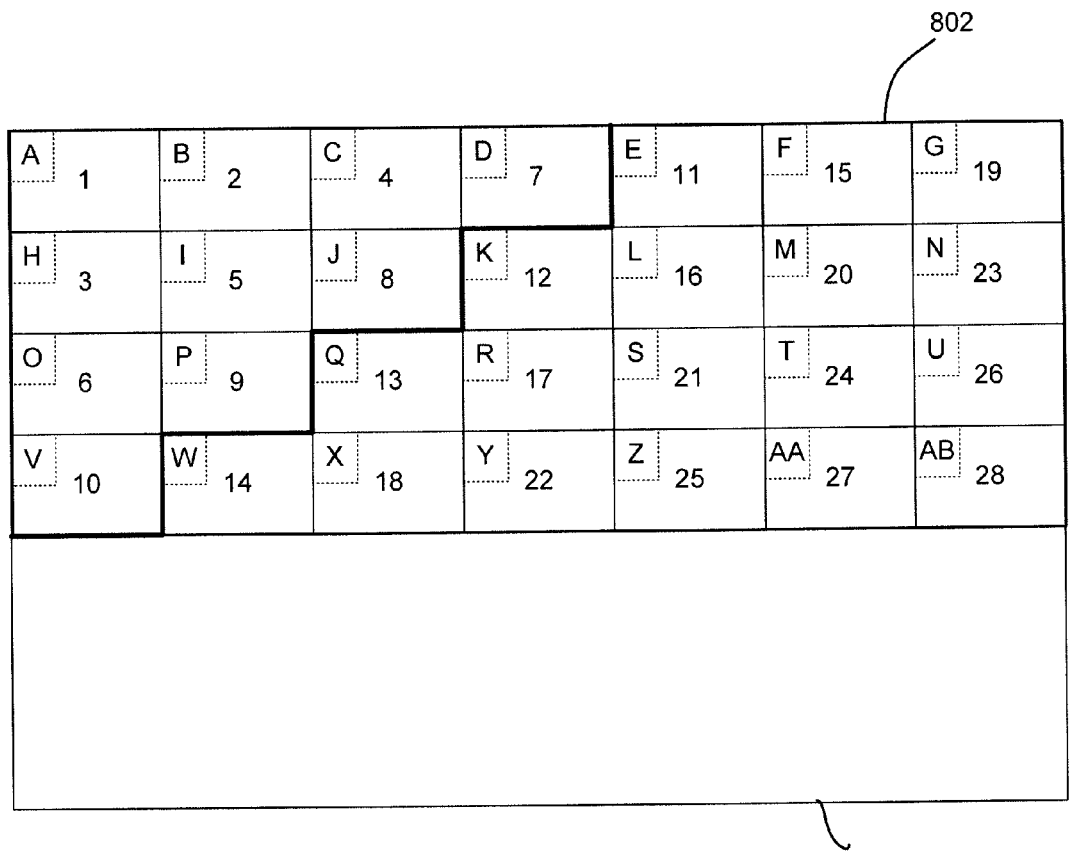

FIG. 8c illustrates an exemplary processing order different from the scan order of FIGS. 8b and 8a. In this example, the order of processing is: macroblock A, then macroblock B, then macroblock H, then macroblock C, then macroblock I, then macroblock O, etc. This processing order still optimizes the use of the module's cache as well as required bandwidth while improving the prediction of the current macroblock since all preceding macroblocks have been processed and their post-processing information is available. While processing order of FIG. 8c has been described for the processing of macroblocks in the prediction module 202, it may also be used in the transformation module 204 in order to optimize the cache size.

Figure 8D:
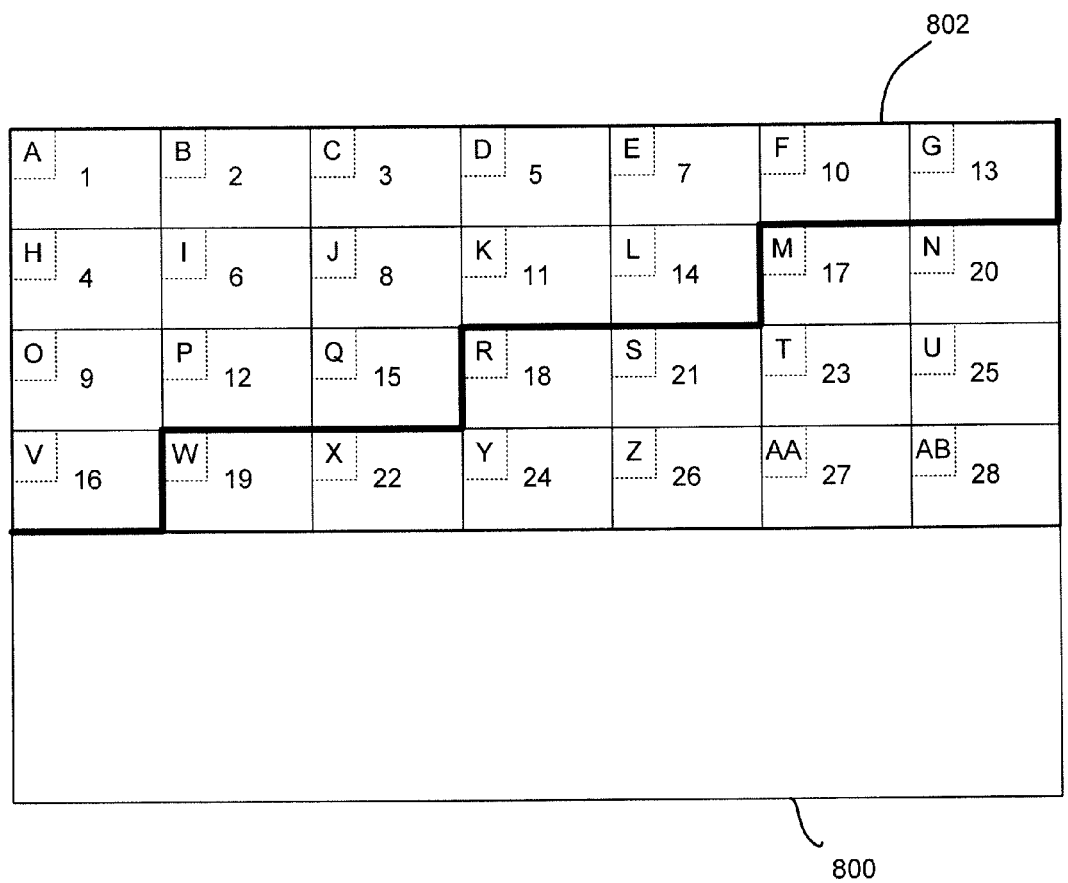
Figure 8E:
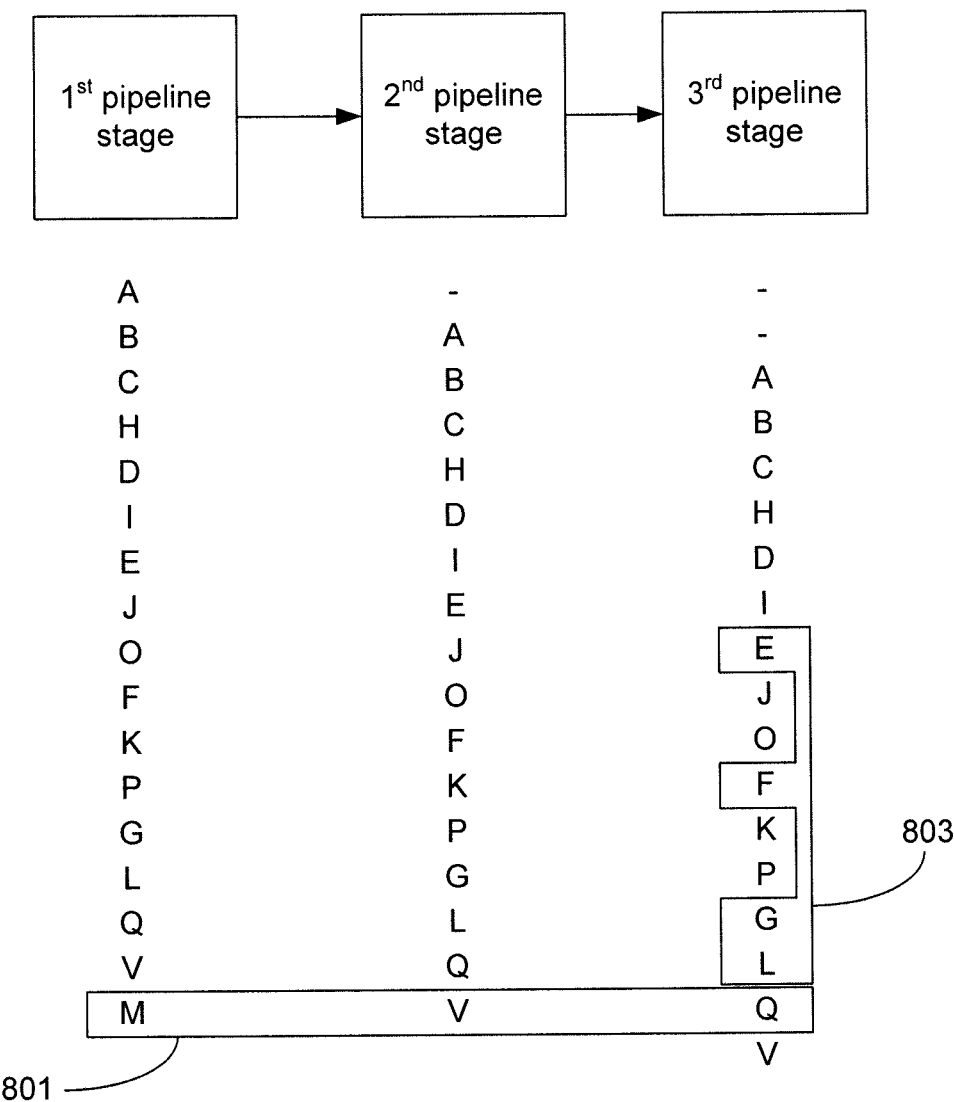
FIG. 8e is an exemplary illustration of a pipelined process using the scanning order of FIG. 8d.

FIG. 8d illustrates yet another embodiment for an order of processing macroblocks within a module. In this example, the order of processing is: macroblock A, then macroblock B, then macroblock C, then macroblock H, then macroblock D, then macroblock I, then macroblock E, etc. This processing order may be used to support a process having a three-step pipeline as there is a distance of three macroblock positions between a macroblock currently being processed and a macroblock previously processed, i.e. macroblocks 18 and 15 or macroblocks 22 and 19, once steady state has been reached (indicated by the dark outline in the figure). Cache, bandwidth, and latency are therefore optimized for the three-step pipeline to ensure that post-processing information from other macroblocks is available when needed to process a given macroblock. For example, at a given time three macroblocks are simultaneously processed in a module (e.g. prediction module 202 or transformation module 204). This is illustrated in FIG. 8e, whereby each stage in the pipeline is illustrated and the order of processing corresponds to that of FIG. 8d. In this example, macroblocks 801 (M, V and Q) are processed simultaneously. Macroblock M is processed at the $1^{st}$ stage, macroblock V is processed at the $2^{nd}$ stage and macroblock Q is processed at the $3^{rd}$ stage of the pipeline. When macroblock M is processed, information may be needed from macroblocks 803 (E, F, G, and L). As macroblock M is the $17^{th}$ macroblock to be processed and macroblocks E, F, G, and L were processed $7^{th}$, $10^{th}$, $13^{th}$, and $14^{th}$ respectively, this information is available when needed for processing macroblock M. In particular, processing of macroblock L by the third stage in the pipeline is completed when macroblock M is processed by the first stage in the pipeline. The three stage pipeline of FIG. 8e is an exemplary pipeline for a module. Other orders may be defined to accommodate pipelines of different depths.

In order to allow independent processing of the macroblocks in accordance with different processing orders, each module of the codec 102 may write to memory 104 using a predetermined configuration that will allow retrieval of the macroblocks by the subsequent module in accordance with its designated processing order. For example, each module may write to memory in the order in which the data will be read by the next module in the processing chain.

Figure 9A:
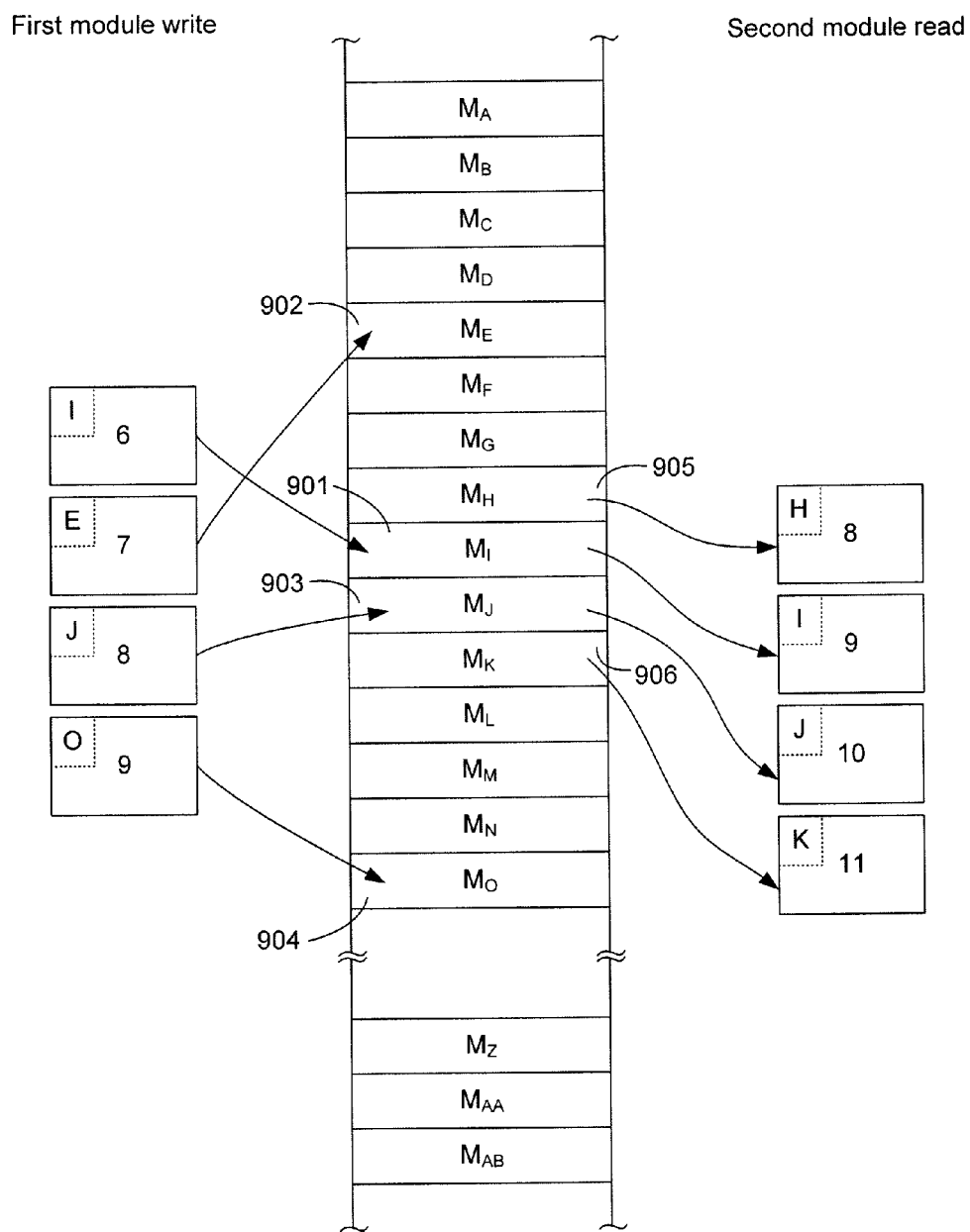
FIGS. 9a-9c are exemplary illustrations of configurations for storing macroblocks in memory.

Various embodiments may be used to write/store the macroblocks in memory in between processing by the various modules. For example, a first embodiment comprises fixed mapping, illustrated in FIG. 9a. In a fixed mapping scheme, the first module may write each macroblock to a known and predetermined address in memory, and the second module may then retrieve each macroblock from the known and predetermined address. The addresses may be chosen so that retrieving the macroblocks from sequential addresses results in the designated processing order for the module. For example, if a first module processes the macroblocks according to the order illustrated in FIG. 8d while a second module processes the macroblocks according to the order illustrated in FIG. 8a, when the first module writes the processed macroblocks to memory, this would be done such that macroblock I is at a first address 901, macroblock E is at a second address 902, macroblock J is at a third address 903, and macroblock O is at a fourth address 904 etc, such that when the second module retrieves the macroblocks from the first address, the second address, the third address, etc, they are in the natural scan order of FIG. 8a and ready for processing. For example, the second module may read macroblocks H, I, J and K at addresses 905, 901, 903 and 906 respectively.

Figure 9B:
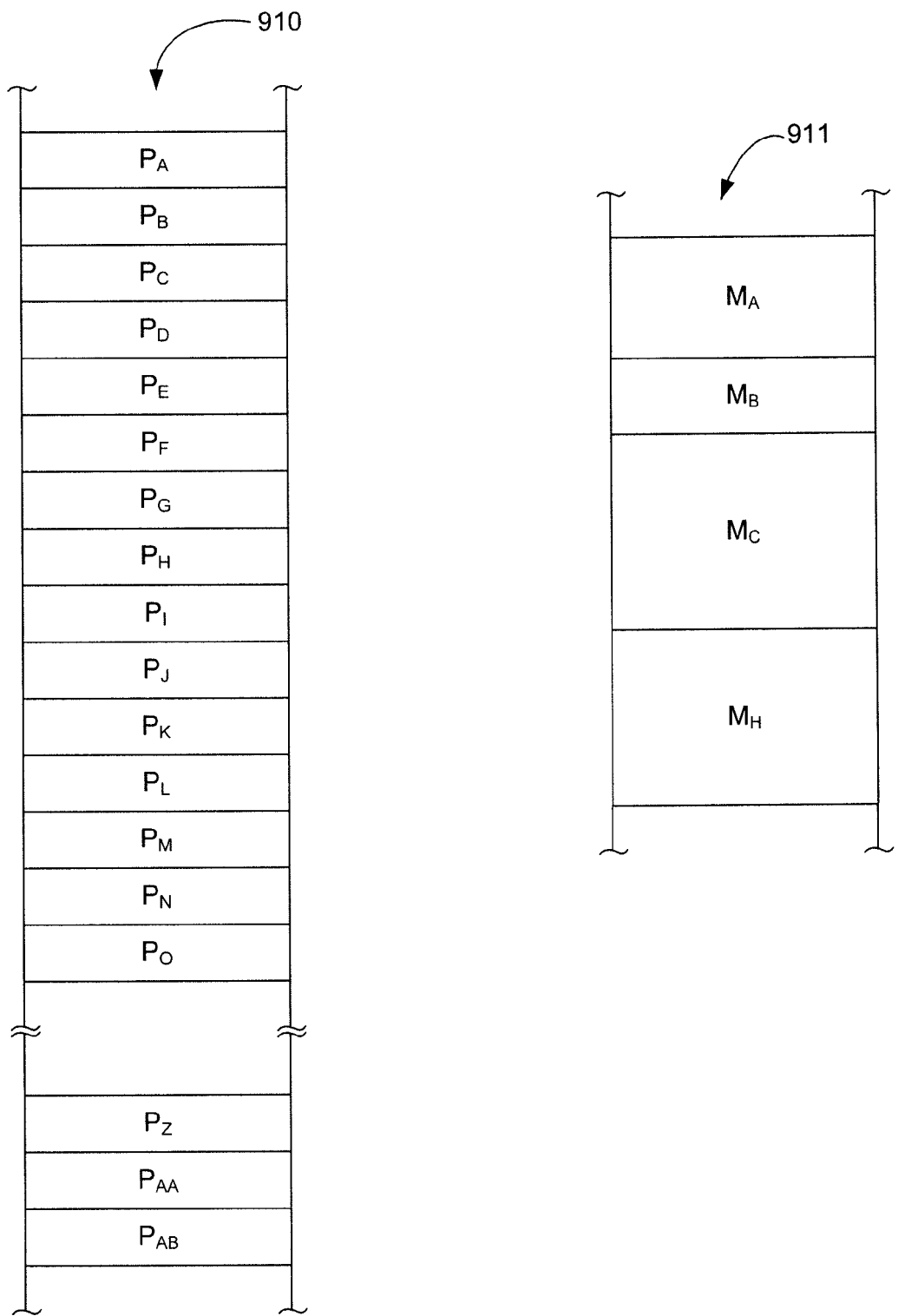

In a second exemplary embodiment, illustrated in FIG. 9b, an indirect mapping scheme is used to write to memory. Two surfaces in memory 910, 911 may be used, one for the macroblocks (surface 911) and another for pointers (surface 910) to the address at which each macroblock is saved. In this embodiment, the memory blocks in surface 911 may be of variable sizes and the pointers may be of fixed sizes, thereby providing more flexibility when writing to memory in choosing the size of needed space. Pointer $P_A$ points to memory block $M_A$, pointer $P_B$ points to memory block $M_B$, pointer $P_C$ points to memory block $M_C$, etc.

Figure 9C:
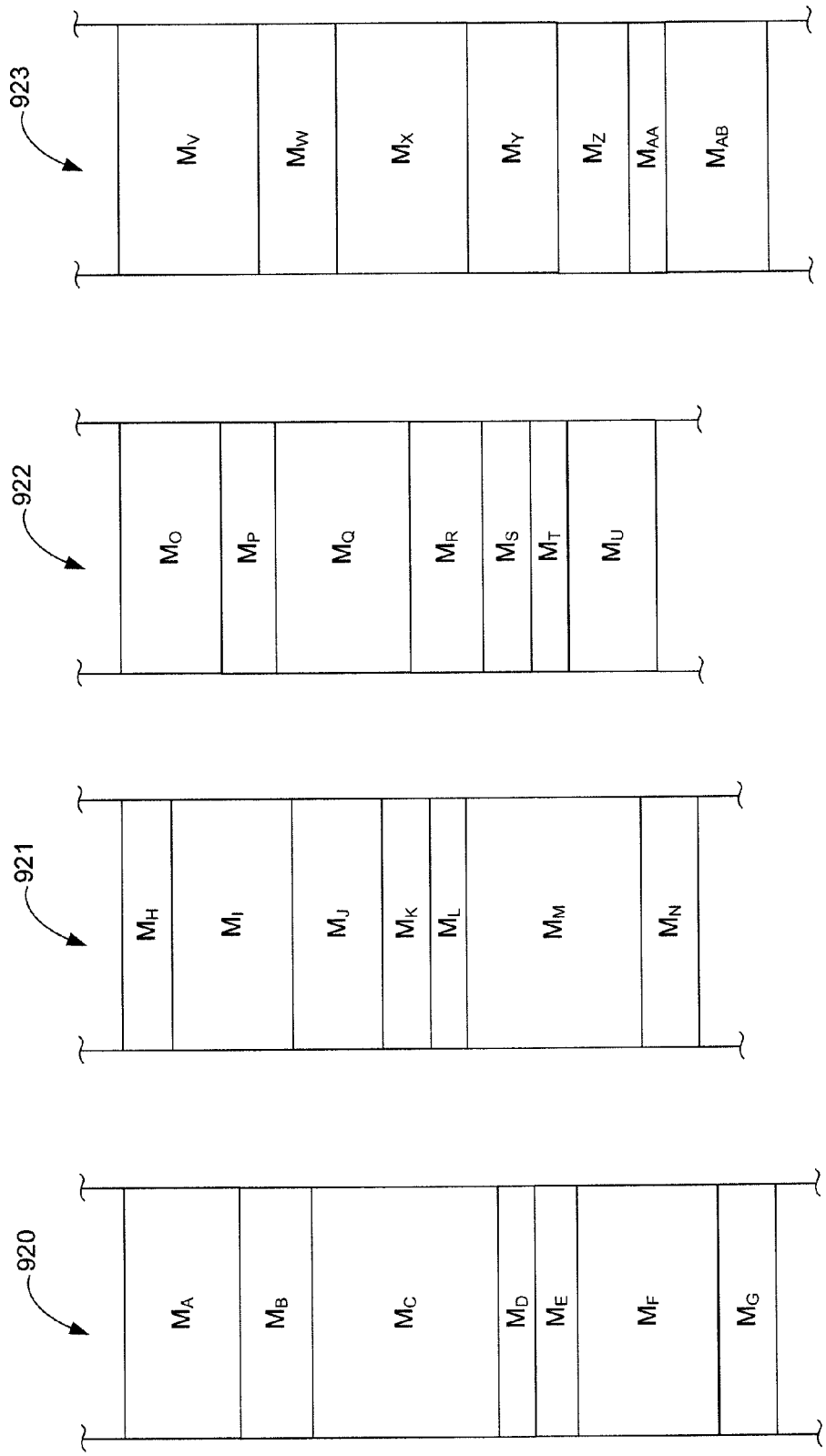

In yet another exemplary embodiment, illustrated in FIG. 9c, four surface buffers 920, 921, 922, 923 may be used, with four corresponding to an exemplary number of rows of macroblocks in a portion of a picture. A module may write each macroblock to the buffer corresponding to the row in which the macroblock will be processed in the subsequent module. The subsequent module may then retrieve each row from each buffer and process the macroblocks accordingly. Other embodiments for writing and storing data in memory may also be used.

Figure 10:
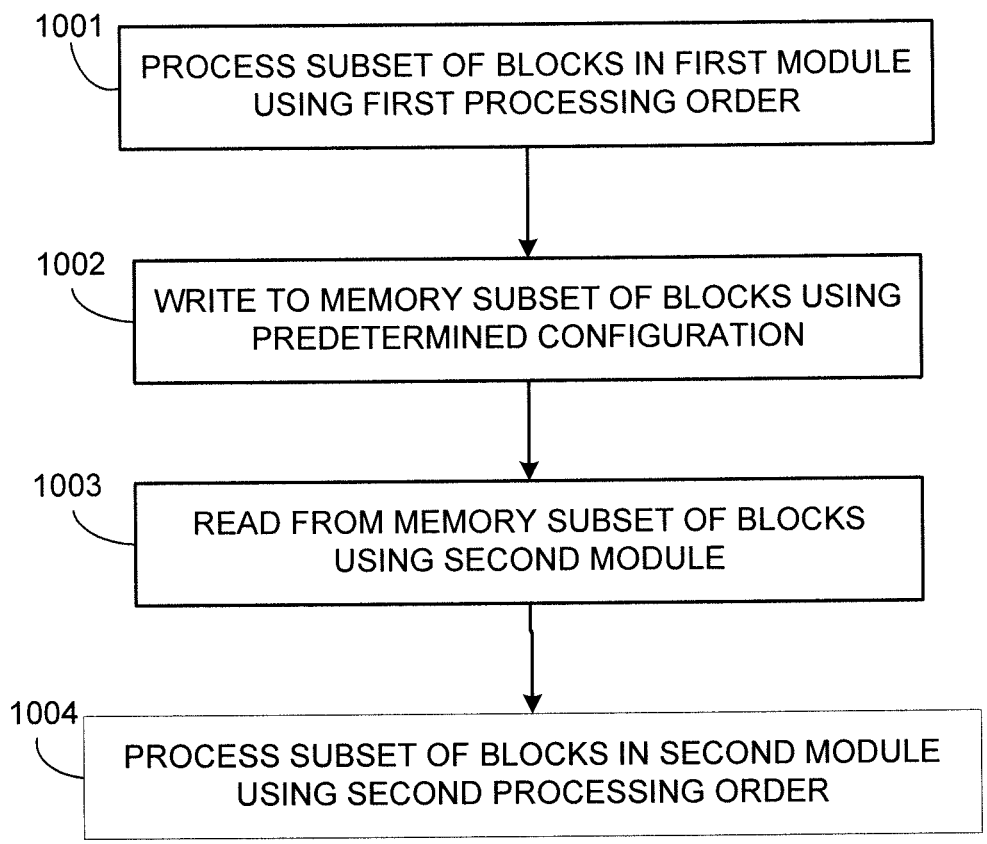
FIG. 10 is a flowchart of an exemplary method for processing data using different processing orders in different modules.

Referring now to FIG. 10, the processing of macroblocks of data using different processing orders in different modules is described. In a first step 1001, the subset of macroblocks is processed in the first module using a first processing order. This order may be any of the exemplary processing orders illustrated in FIGS. 8a-8d or any other processing order for image data satisfying the requirements of the codec 102. For example, the requirements may be the need for a natural scan order to respect standard specifications, the need to use the result of the compression of a previous macroblock, or the need for completion of the processing of a preceding macroblock before starting to process a given macroblock (as illustrated in FIG. 8e).

The first module may correspond to any of the modules illustrated in the codec 102 of FIG. 2a, or to any other multi-module architecture for a codec. For example, there may be a first module for performing prediction, transformation and quantization and a second module for performing entropy. Alternatively, there may be a first module for performing prediction and a second module for performing transformation, quantization and entropy. The method is thus applicable to a wide variety of multi-module architectures for codecs.

In step 1002, the first module has completed its processing of the subset of macroblocks and writes the processed macroblocks to memory using a predetermined configuration. The configuration may be fixed mapping, indirect mapping, multiple buffers, or any other configuration for storing image data in memory. In step 1003, the second module reads the macroblocks processed by the first module from memory using the predetermined configuration. The second module may be anyone of the modules as illustrated in FIG. 2a and as described above.

In step 1004, the macroblocks are processed by the second module using a second processing order different from the first processing order. The second processing order may be any of the exemplary processing orders illustrated in FIGS. 8a-8d or any other known processing order for image data. In some embodiments, once the second module has completed its processing of the subset of macroblocks, it may then write the macroblocks to memory using another predetermined configuration. This predetermined configuration may be the same or differ from the predetermined configuration used by the first module to write to memory. A third module may then read the macroblocks from memory and process them using a third processing order. The third processing order may be the same or differ from the first processing order and/or the second processing order. The three modules may thus process the macroblocks using three different processing orders or two different processing orders. All the module of the codec 102 can have a different processing order.

In some of the embodiments described above, the modules included in the codec 102 are described as register-based engines. The register-based engines may be double or multi-buffered. In other embodiments, one or more of the modules may be implemented as command-based engines receiving commands and data and performing the tasks as described above.

According to some embodiments, the different modules present in codec 102 may be duplicated in order to speed up the processing of data and provide better performances to the codec 102 when implemented in a chip. For example, the codec 102 may comprise many instances of the entropy module 208, and/or many instances of the transformation module 204 and the prediction module 202. According to other embodiments, the entropy module 208 of the codec 102 may comprise a plurality of sub-modules, each module performing a compression or decompression type. For example, the entropy module 208 may comprise a CABAC encode module and a CABAC decode module, a CAVLC encode module and a CAVL decode module. In another example, the entropy module 208 includes a plurality of instances of the CABAC decode module, a CAVLC encode module, a CAVLC decode module along with a CABAC encode module. In general the entropy module 208 may comprise a plurality of the same sub-module and other sub-modules.

According to some embodiments, the control module 200 may configure all the different modules of the codec 102 at receipt of a compression or decompression request from an external application. The control module 200 thus configures the prediction module 202, the transformation module 204, the in-loop filter module 206 and/or the entropy module 208 simultaneously upon receipt of the compression or decompression request from an application. Different modules may be configured according to the type of request made (compression or decompression). In other embodiments, the control module 200 configures a module only once the previous module has finished processing a picture or a portion of the picture.

In some embodiments, the codec 102 may be configured to process a plurality of independent streams simultaneously. For example, the prediction module 202 may be configured to process a first group of macroblocks of a first stream while the transformation module 204 is configured to process a first group of macroblocks of a second stream. At any given time, the processing occurring in a module is independent from the processing of the other modules. Consequently the task and the data processed in the different modules are independent. For example, a prediction module 202 can be configured to perform the compression steps of a first group of macroblocks while the entropy module 208 is performing decompression tasks of a second stream.

In some of the embodiments described above, the modules included in the codec 102 are described as register-based engines. The register-based engines may be double or multi-buffered. In other embodiments, one or more of the modules may be implemented as command-based engines receiving commands and data and performing the tasks as described above.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. Furthermore, the data paths may be communication paths, communication links, data buses, and any other type of connection allow the transfer of data. For example, in some embodiments, a data path may represent a plurality of communication buses. The data paths may be bi-directional or uni-directional and may carry instructions, commands, handshake signals, requests and/or control information. Additional data paths to those shown in the figures may also be provided between the various components of the system 100. The structure illustrated is thus provided for efficiency of teaching the present embodiment.

It should be noted that the present invention can be carried out as a method and can be embodied in a system or on a computer readable medium. The embodiments of the invention described above are intended to be exemplary only. The scope of the invention is therefore intended to be limited solely by the scope of the appended claims.

The invention claimed is:

1. A method for compressing a data stream with a device for compression comprising at least a first module and a second module, the method comprising:
   processing a first subset of macroblocks of the data stream in the first module in accordance with a first processing order, for compressing;
   writing to memory the first subset of macroblocks in accordance with a first predetermined configuration;
   reading from memory the first subset of macroblocks in the first predetermined configuration by the second module; and
   processing the first subset of macroblocks in the second module in accordance with a second processing order different from the first processing order, for compressing, wherein writing to memory in the first predetermined configuration comprises writing in an order corresponding to a reading order of the second module for the second processing order.

2. The method of claim 1, further comprising processing a second set of macroblocks in the second module concurrently with the processing of the first set of macroblocks in the first module.

3. The method of claim 2, wherein the second set of macroblocks corresponds to a second data stream independent from the first data stream.

4. The method of claim 1, wherein one of the first processing order and the second processing order comprises having at least three macroblock positions separating consecutively processed macroblocks once a steady state has been reached.

5. A method for compressing a data stream with a device for compression comprising at least a first module and a second module, the method comprising:
   processing a first subset of macroblocks of the data stream in the first module in accordance with a first processing order, for compressing;
   writing to memory the first subset of macroblocks in accordance with a first predetermined configuration;
   reading from memory the first subset of macroblocks in the first predetermined configuration by the second module; and
   processing the first subset of macroblocks in the second module in accordance with a second processing order different from the first processing order, for compressing, wherein processing the first subset of macroblocks in the first module comprises generating prediction data for each one of the macroblocks, for use by the second module, and wherein processing the first subset of macroblocks in the second module comprises applying a transformation to the first subset of macroblocks in accordance with the prediction data and performing entropy encoding.

6. A method for compressing a data stream with a device for compression comprising at least a first module and a second module, the method comprising:
   processing a first subset of macroblocks of the data stream in the first module in accordance with a first processing order, for compressing;
   writing to memory the first subset of macroblocks in accordance with a first predetermined configuration;
   reading from memory the first subset of macroblocks in the first predetermined configuration by the second module; and
   processing the first subset of macroblocks in the second module in accordance with a second processing order different from the first processing order, for compressing, wherein processing the first subset of macroblocks in the first module comprises generating a set of prediction data and applying a transformation to the first subset of macroblocks in accordance with the prediction data, and wherein processing the first subset of macroblocks in the second module comprises performing entropy encoding.

7. A method for compressing a data stream with a device for compression comprising at least a first module and a second module, the method comprising:
   processing a first subset of macroblocks of the data stream in the first module in accordance with a first processing order, for compressing;
   writing to memory the first subset of macroblocks in accordance with a first predetermined configuration;

reading from memory the first subset of macroblocks in the first predetermined configuration by the second module;

processing the first subset of macroblocks in the second module in accordance with a second processing order different from the first processing order, for compressing;

writing to memory the first subset of macroblocks from the second module in accordance with a second predetermined configuration;

reading from memory the first subset of macroblocks in the second predetermined configuration from a third module; and processing the first subset of macroblocks in the third module in accordance with a third processing order.

8. The method of claim 7, wherein the third processing order is different from the second processing order.

9. The method of claim 8, wherein the third processing order is different from the first processing order.

10. A device for compression, for processing a data stream comprising:

a first module for compressing comprising a first circuit configured for processing a first subset of macroblocks of the data stream in accordance with a first processing order and writing to memory the first subset of macroblocks in accordance with a first predetermined configuration; and a second module for compressing comprising a second circuit configured for reading from memory the first subset of macroblocks in the first predetermined configuration, and processing the first subset of macroblocks in accordance with a second processing order different from the first processing order, wherein the first module is configured for writing to memory in an order corresponding to a reading order of the second module for the second processing order.

11. The device of claim 10, wherein the second module is configured for processing a second set of macroblocks concurrently with the processing of the first set of macroblocks in the first module.

12. The device of claim 11, wherein the second set of macroblocks corresponds to a second data stream independent from the first data stream.

13. The device of claim 10, wherein one of the first processing order and the second processing order comprises having at least three macroblock positions separating consecutively processed macroblocks once a steady state has been reached.

14. A device for compression, for processing a data stream comprising:

a first module for compressing comprising a first circuit configured for processing a first subset of macroblocks of the data stream in accordance with a first processing order and writing to memory the first subset of macroblocks in accordance with a first predetermined configuration; and a second module for compressing comprising a second circuit configured for reading from memory the first subset of macroblocks in the first predetermined configuration, and processing the first subset of macroblocks in accordance with a second processing order different from the first processing order, wherein the first module is a prediction module and the second module is a transformation module for performing transformation and quantization of the image data.

15. A device for compression, for processing a data stream comprising:

a first module for compressing comprising a first circuit configured for processing a first subset of macroblocks of the data stream in accordance with a first processing order and writing to memory the first subset of macroblocks in accordance with a first predetermined configuration; and a second module for compressing comprising a second circuit configured for reading from memory the first subset of macroblocks in the first predetermined configuration, and processing the first subset of macroblocks in accordance with a second processing order different from the first processing order, wherein the first module is a transformation module for performing transformation and quantization of the image data and the second module is an entropy module.

16. A device for compression, for processing a data stream comprising:

a first module for compressing comprising a first circuit configured for processing a first subset of macroblocks of the data stream in accordance with a first processing order and writing to memory the first subset of macroblocks in accordance with a first predetermined configuration; and a second module for compressing comprising a second circuit configured for reading from memory the first subset of macroblocks in the first predetermined configuration, and processing the first subset of macroblocks in accordance with a second processing order different from the first processing order, wherein the second module is further configured for writing to memory the first subset of macroblocks in accordance with a second predetermined configuration, and further comprising a third module comprising a third circuit configured for reading from memory the first subset of macroblocks in the second predetermined configuration and processing the first subset of macroblocks in accordance with a third processing order.

17. The device of claim 16, wherein the third processing order is different from the second processing order.

18. The device of claim 17, wherein the third processing order is different from the first processing order.

19. A method for decompressing a data stream with a device for decompression comprising at least a first module and a second module, the method comprising:

processing a first subset of macroblocks of the data stream in the first module in accordance with a first processing order, for decompressing;

writing to memory the first subset of macroblocks in accordance with a first predetermined configuration;

reading from memory the first subset of macroblocks in the first predetermined configuration by the second module; and processing the first subset of macroblocks in the second module in accordance with a second processing order different from the first processing order, for decompressing, wherein writing to memory in the first predetermined configuration comprises writing in an order corresponding to a reading order of the second module for the second processing order.

20. The method of claim 19, further comprising processing a second set of macroblocks in the second module concurrently with the processing of the first set of macroblocks in the first module.

21. The method of claim 20, wherein the second set of macroblocks corresponds to a second data stream independent from the first data stream.

22. The method of claim 19, wherein one of the first processing order and the second processing order comprises having at least three macroblock positions separating consecutively processed macroblocks once a steady state has been reached.

23. A method for decompressing a data stream with a device for decompression comprising at least a first module and a second module, the method comprising:
processing a first subset of macroblocks of the data stream in the first module in accordance with a first processing order, for decompressing;
writing to memory the first subset of macroblocks in accordance with a first predetermined configuration;
reading from memory the first subset of macroblocks in the first predetermined configuration by the second module; and
processing the first subset of macroblocks in the second module in accordance with a second processing order different from the first processing order, for decompressing, wherein processing the first subset of macroblocks in the first module comprises generating a set of prediction data and applying a transformation to the first subset of macroblocks in accordance with the prediction data, and wherein processing the first subset of macroblocks in the second module comprises performing entropy encoding.

24. A device for decompression, for processing a data stream, comprising:
a first module for decompressing comprising a first circuit configured for processing a first subset of macroblocks of the data stream in accordance with a first processing order, and writing to memory the first subset of macroblocks in accordance with a first predetermined configuration, for decompressing; and
a second module for decompressing comprising a second circuit configured for reading from memory the first subset of macroblocks in the first predetermined configuration, and processing the first subset of macroblocks in accordance with a second processing order different from the first processing order, wherein the first module is configured for writing to memory in an order corresponding to a reading order of the second module for the second processing order.

25. The device of claim 24, wherein the second module is configured for processing a second set of macroblocks concurrently with the processing of the first set of macroblocks in the first module.

26. The device of claim 25, wherein the second set of macroblocks corresponds to a second data stream independent from the first data stream.

27. The device of claim 24, wherein one of the first processing order and the second processing order comprises having at least three macroblock positions separating consecutively processed macroblocks once a steady state has been reached.

28. A device for decompression, for processing a data stream, comprising:
a first module for decompressing comprising a first circuit configured for processing a first subset of macroblocks of the data stream in accordance with a first processing order, and writing to memory the first subset of macroblocks in accordance with a first predetermined configuration, for decompressing; and
a second module for decompressing comprising a second circuit configured for reading from memory the first subset of macroblocks in the first predetermined configuration, and processing the first subset of macroblocks in accordance with a second processing order different from the first processing order, wherein the first module is a transformation module for performing transformation and quantization of the image data and the second module is an entropy module.

* * * * *